(12) United States Patent
Liu et al.

(10) Patent No.: US 12,389,374 B2
(45) Date of Patent: Aug. 12, 2025

(54) METHOD AND DEVICE IN NODES USED FOR WIRELESS COMMUNICATION

(71) Applicant: BUNKER HILL TECHNOLOGIES LLC, Allen, TX (US)

(72) Inventors: Jin Liu, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 468 days.

(21) Appl. No.: 17/878,066

(22) Filed: Aug. 1, 2022

(65) Prior Publication Data

US 2023/0049210 A1 Feb. 16, 2023

(30) Foreign Application Priority Data

Aug. 11, 2021 (CN) .......................... 202110917192.2

(51) Int. Cl.
*H04W 72/02* (2009.01)
*H04W 72/0446* (2023.01)
*H04W 72/0453* (2023.01)
*H04W 72/56* (2023.01)

(52) U.S. Cl.
CPC ....... *H04W 72/02* (2013.01); *H04W 72/0446* (2013.01); *H04W 72/0453* (2013.01); *H04W 72/56* (2023.01)

(58) Field of Classification Search
CPC ............. H04W 72/02; H04W 72/0453; H04W 72/0446; H04W 72/56
See application file for complete search history.

(56) References Cited

U.S. PATENT DOCUMENTS

| 7,321,926 B1* | 1/2008 | Zhang ................. H04L 67/1017 718/104 |
| 7,978,674 B1* | 7/2011 | Oroskar .............. H04W 72/044 370/335 |
| 8,676,621 B1* | 3/2014 | Helfrich ............. G06Q 10/0631 705/37 |
| 2012/0257497 A1* | 10/2012 | Yoshimoto .......... H04W 72/542 370/230 |

* cited by examiner

*Primary Examiner* — Brenda H Pham
(74) *Attorney, Agent, or Firm* — Ascenda Law Group, PC

(57) ABSTRACT

A first node receives a first signaling, the first signaling indicates a first resource pool and X1 resource sub-pools, and the X1 resource sub-pools belong to the first resource pool; determines a candidate resource set out of the first resource pool; transmits a target signal on a target time-frequency resource block, and the target time-frequency resource block belongs to the candidate resource set; a target resource subset belongs to a target resource sub-pool; a first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and the target threshold is used to determine the target resource subset out of the target resource sub-pool. The present application strikes a balance between resource utilization and interference avoidance for users of a shared resource pool.

12 Claims, 5 Drawing Sheets

METHOD AND DEVICE IN NODES USED FOR WIRELESS COMMUNICATION

CROSS REFERENCE TO RELATED APPLICATIONS

This application claims the priority benefit of Chinese Patent Application No. 202110917192.2, filed on Aug. 11, 2021, the full disclosure of which is incorporated herein by reference.

BACKGROUND

Technical Field

The present application relates to transmission methods and devices in wireless communication systems, and in particular to a sidelink-related transmission scheme and device in wireless communications.

Related Art

Starting from Long Term Evolution (LTE), 3rd Generation Partner Project (3GPP) has been developing sidelink (SL) as a direct communication method between users, and has completed a first New Radio (NR) SL standard of "5G V2X with NR Sidelink" in Release-16 (Rel-16). In Rel-16, the NR SL is mainly designed for Vehicle-To-Everything (V2X), while it can also be used for Public Safety.

Due to time constraints, NR SL Rel-16 cannot fully support traffic requirements and work scenarios identified by 3GPP for 5G V2X. Therefore, the NR SL is researched to be enhanced in Rel-17 in 3GPP.

SUMMARY

In NR SL systems, random resource selection is allowed, partially-sensing and fully-sensing UEs share a same resource pool, when a sensing UE senses time-frequency resources occupied by an adjacent Vulnerable road user (VRU) or Pedestrian user equipment (PUE), although a data priority of the sensing UE is higher than a data priority of the adjacent VRU or PUE, the interference to an adjacent UE cannot be avoided since the VRU or the PUE adopts the method of random access selection instead of executing channel sensing, the sensing UE has to take the initiative to avoid interfering time-frequency resources, which results in that the transmission performance of the high-end sensing UE is affected. Therefore, some companies propose to divide multiple resource zones in a resource pool, and UEs adopting different resource allocation schemes can allocate resources in different resource zones, so as to avoid resource conflicts to a certain extent.

In view of the above problems, the present application discloses a method of resource allocation, thereby effectively avoiding the problem of resource conflicts between UEs of a shared resource pool. It should be noted that the embodiments in a User Equipment (UE) in the present application and characteristics of the embodiments may be applied to a base station if no conflict is incurred, and vice versa. And the embodiments in the present application and the characteristics in the embodiments can be arbitrarily combined if there is no conflict. Though originally targeted at SL, the present application is also applicable to uplink (UL). Though originally targeted at single-carrier communications, the present application is also applicable to multicarrier communications. Though originally targeted at single-antenna communications, the present application is also applicable to multi-antenna communications. Besides, the present application is not only targeted at V2X scenarios, but also at communication scenarios between terminals and base stations, terminals and relays as well as relays and base stations, where similar technical effect can be achieved. Additionally, the adoption of a unified solution for various scenarios, including but not limited to V2X scenarios and communication scenarios between terminals and base stations, contributes to the reduction of hardware complexity and costs.

It should be noted that interpretations of the terminology in the present application refer to definitions given in the 3GPP TS36 series, TS37 series, TS38 series, as well as definitions given in Institute of Electrical and Electronics Engineers (IEEE) protocol specifications.

The present application provides a method in a first node for wireless communications, comprising:

receiving a first signaling, the first signaling indicating a first resource pool and X1 resource sub-pools, any of the X1 resource sub-pools belonging to the first resource pool, X1 being a positive integer greater than 1;

determining a candidate resource set out of the first resource pool, the candidate resource set comprising at least one candidate time-frequency resource block; and transmitting a target signal on a target time-frequency resource block, the target time-frequency resource block being a candidate time-frequency resource block comprised in the candidate resource set;

herein, the candidate resource set comprises at least one candidate resource subset, a target resource subset is one of the at least one candidate resource subset comprised in the candidate resource set; a candidate time-frequency resource block in the target resource subset belongs to a target resource sub-pool, and the target resource sub-pool is one of the X1 resource sub-pools; the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and the target threshold is used to determine the target resource subset out of the target resource sub-pool.

In one embodiment, a problem to be solved in the present application is: when UEs adopting different resource allocation schemes share a resource pool, non-sensing UEs cannot avoid interferences to adjacent UEs, and sensing UEs have to take the initiative to avoid interfering time-frequency resources, resulting in the transmission performance of high-end sensing UEs being affected.

In one embodiment, a method in the present application is: different sensing thresholds are adjusted according to different resource zones in a resource pool, so as to enable that high-end sensing UEs give more preference to resource zones allocated to purely-sensing UEs in a same resource pool, and sub-optimally to resource zones allocated to non-sensing UEs.

In one embodiment, the advantage of the above method is that sensing UEs not only have sufficient available resources, but also can avoid resource conflicts with non-sensing UEs as much as possible.

According to one aspect of the present application, the above method is characterized in comprising:

monitoring a second signaling in the first resource pool, the second signaling indicating a second priority and a first time-frequency resource block; and measuring in the first time-frequency resource block, the first time-frequency resource block belonging to the target resource sub-pool;

herein, the first priority, the second priority and the target resource sub-pool are used together to determine the target threshold out of the X1 first-type thresholds; the first time-frequency resource block is associated with a second time-frequency resource block, the second time-frequency resource block belongs to the target resource sub-pool, and the first time-frequency resource block and the second time-frequency resource block are orthogonal in time domain; a size relationship of a measurement result in the first time-frequency resource block and the target threshold is used to determine whether the second time-frequency resource block belongs to the target resource subset.

According to one aspect of the present application, the above method is characterized in that the X1 first-type thresholds belong to one of multiple first-type threshold lists; the first priority and the second priority are used together to determine a first-type threshold list to which the X1 first-type thresholds belong out of the multiple first-type threshold lists; the target resource sub-pool is used to determine the target threshold out of the X1 first-type thresholds.

According to one aspect of the present application, the above method is characterized in that the X1 first-type thresholds respectively belong to X1 second-type threshold lists, and the target threshold belongs to one of the X1 second-type threshold lists; the target resource sub-pool is used to determine a second-type threshold list to which the target threshold belongs out of the X1 second-type threshold lists; the first priority and the second priority are used together to determine the target threshold out of a second-type threshold list to which the target threshold belongs.

According to one aspect of the present application, the above method is characterized in that a first reference threshold is one of multiple reference thresholds, and the first reference threshold is one of the X1 first-type thresholds; the first priority and the second priority are used together to determine the first reference threshold out of the multiple reference thresholds, the target resource sub-pool is used to determine a first offset value, and the first reference threshold and the first offset value are used together to determine the target threshold.

According to an aspect of the present application, the above method is characterized in that the X1 resource sub-pools comprise a first resource sub-pool and a second resource sub-pool; a first threshold is a first-type threshold corresponding to the first resource sub-pool among the X1 first-type thresholds, and a second threshold is a first-type threshold corresponding to the second resource sub-pool among the X1 first-type thresholds; the first threshold is used to determine a first candidate resource subset out of the first resource sub-pool, and the second threshold is used to determine a second candidate resource subset out of the second resource sub-pool; both the first candidate resource subset and the second candidate resource subset belong to the candidate resource set; the first threshold is higher than the second threshold; the target time-frequency resource block is preferentially selected from a former of the first candidate resource subset and the second candidate resource subset.

According to an aspect of the present application, the above method is characterized in that the X1 resource sub-pools comprise a first resource sub-pool and a second resource sub-pool; a first threshold is a first-type threshold corresponding to the first resource sub-pool among the X1 first-type thresholds, and a second threshold is a first-type threshold corresponding to the second resource sub-pool among the X1 first-type thresholds; the first threshold is higher than the second threshold; the first threshold is used to determine a first candidate resource subset out of the first resource sub-pool, the first candidate resource subset belongs to the candidate resource set, and the first candidate resource subset comprises Q1 candidate time-frequency resource blocks, Q1 being a positive integer greater than 1; a size relationship of Q1 and a first value is used to determine whether the candidate resource set is orthogonal to the second resource sub-pool.

According to one aspect of the present application, the above method is characterized in that the first node is a UE.

According to one aspect of the present application, the above method is characterized in that the first node is a relay node.

According to one aspect of the present application, the above method is characterized in that the first node is a base station.

The present application provides a method in a second node for wireless communications, comprising:

receiving a first signaling, the first signaling indicating a first resource pool and X1 resource sub-pools, any of the X1 resource sub-pools belonging to the first resource pool, X1 being a positive integer greater than 1;

transmitting a second signaling in a first resource pool, the second signaling indicating a second priority and a first time-frequency resource block, the first time-frequency resource block belonging to a target resource sub-pool, and the target resource sub-pool being one of the X1 resource sub-pools; and receiving a target signal on a target time-frequency resource block, the target time-frequency resource block belonging to the target resource sub-pool;

herein, the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and a size relationship of a measurement result in the first time-frequency resource block and the target threshold is used by a receiver of the second signaling to determine the target time-frequency resource block out of the target resource sub-pool; the first priority, the second priority and the target resource sub-pool are used together to determine the target threshold out of the X1 first-type thresholds.

According to one aspect of the present application, the above method is characterized in that the X1 first-type thresholds belong to one of multiple first-type threshold lists; the first priority and the second priority are used together to determine a first-type threshold list to which the X1 first-type thresholds belong out of the multiple first-type threshold lists; the target resource sub-pool is used to determine the target threshold out of the X1 first-type thresholds.

According to one aspect of the present application, the above method is characterized in that the X1 first-type thresholds respectively belong to X1 second-type threshold lists, and the target threshold belongs to one of the X1 second-type threshold lists; the target resource sub-pool is used to determine a second-type threshold list to which the target threshold belongs out of the X1 second-type threshold lists; the first priority and the second priority are used together to determine the target threshold out of a second-type threshold list to which the target threshold belongs.

According to one aspect of the present application, the above method is characterized in that a first reference threshold is one of multiple reference thresholds, and the first reference threshold is one of the X1 first-type thresholds; the first priority and the second priority are used together to determine the first reference threshold out of the multiple reference thresholds, the target resource sub-pool is used to determine a first offset value, and the first reference threshold and the first offset value are used together to determine the target threshold.

According to one aspect of the present application, the above method is characterized in that the second node is a UE.

According to one aspect of the present application, the above method is characterized in that the second node is a relay node.

According to one aspect of the present application, the above method is characterized in that the second node is a base station.

The present application provides a first node for wireless communications, comprising:

a first receiver, receiving a first signaling, the first signaling indicating a first resource pool and X1 resource sub-pools, any of the X1 resource sub-pools belonging to the first resource pool, X1 being a positive integer greater than 1;

a second receiver, determining a candidate resource set out of the first resource pool, the candidate resource set comprising at least one candidate time-frequency resource block; and a first transmitter, transmitting a target signal on a target time-frequency resource block, the target time-frequency resource block being a candidate time-frequency resource block comprised in the candidate resource set;

herein, the candidate resource set comprises at least one candidate resource subset, a target resource subset is one of the at least one candidate resource subset comprised in the candidate resource set; a candidate time-frequency resource block in the target resource subset belongs to a target resource sub-pool, and the target resource sub-pool is one of the X1 resource sub-pools; the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and the target threshold is used to determine the target resource subset out of the target resource sub-pool.

The present application provides a second node for wireless communications, comprising:

a third receiver, receiving a first signaling, the first signaling indicating a first resource pool and X1 resource sub-pools, any of the X1 resource sub-pools belonging to the first resource pool, X1 being a positive integer greater than 1;

a second transmitter, transmitting a second signaling in a first resource pool, the second signaling indicating a second priority and a first time-frequency resource block, the first time-frequency resource block belonging to a target resource sub-pool, and the target resource sub-pool being one of the X1 resource sub-pools; and the third receiver, receiving a target signal on a target time-frequency resource block, the target time-frequency resource block belonging to the target resource sub-pool;

herein, the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and a size relationship of a measurement result in the first time-frequency resource block and the target threshold is used by a receiver of the second signaling to determine the target time-frequency resource block out of the target resource sub-pool; the first priority, the second priority and the target resource sub-pool are used together to determine the target threshold out of the X1 first-type thresholds.

In one embodiment, the present application is advantageous in the following aspects:

a problem to be solved in the present application is: when UEs adopting different resource allocation schemes share a resource pool, non-sensing UEs cannot avoid interferences to adjacent UEs, and sensing UEs have to take the initiative to avoid interfering time-frequency resources, resulting in the transmission performance of high-end sensing UEs being affected;

the present application adjusts different sensing thresholds according to different resource zones in a resource pool, so as to enable that high-end sensing UEs give more preference to resource zones allocated to purely-sensing UEs in a same resource pool, and sub-optimally to resource zones allocated to non-sensing UEs;

in the present application, sensing UEs not only have sufficient available resources, but also can avoid resource conflicts with non-sensing UEs as much as possible.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
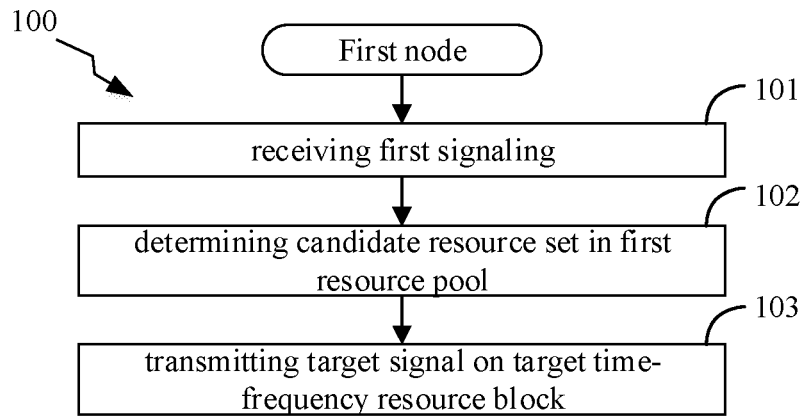
FIG. 1 illustrates a flowchart of the processing of a first node according to one embodiment of the present application.

Embodiment 1 illustrates a flowchart of the processing of a first node according to one embodiment of the present application, as shown in FIG. 1. In FIG. 1, each block represents a step.

In embodiment 1, a first node in the present application first receives a first signaling in step 101, the first signaling indicates a first resource pool and X1 resource sub-pools, any of the X1 resource sub-pools belongs to the first resource pool, X1 being a positive integer greater than 1; determines a candidate resource set out of the first resource pool in step 102, the candidate resource set comprises at least one candidate time-frequency resource block; and transmits a target signal on a target time-frequency resource block in step 103, the target time-frequency resource block is a candidate time-frequency resource block comprised in the candidate resource set; the candidate resource set comprises at least one candidate resource subset, a target resource subset is one of the at least one candidate resource subset comprised in the candidate resource set; a candidate time-frequency resource block in the target resource subset belongs to a target resource sub-pool, and the target resource sub-pool is one of the X1 resource sub-pools; the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and the target threshold is used to determine the target resource subset out of the target resource sub-pool.

In one embodiment, the first resource pool comprises all or partial resources of a sidelink resource pool.

In one embodiment, the first resource pool is a sidelink resource pool.

In one embodiment, the first resource pool comprises multiple time-frequency resource blocks.

In one embodiment, at least one of the multiple time-frequency resource blocks comprised in the first resource pool comprises a Physical Sidelink Control Channel (PSCCH).

In one embodiment, at least one of the multiple time-frequency resource blocks comprised in the first resource pool comprises a Physical Sidelink Shared Channel (PSSCH).

In one embodiment, at least one of the multiple time-frequency resource blocks comprised in the first resource pool comprises a PSCCH and a PSSCH.

In one embodiment, at least one of the multiple time-frequency resource blocks comprised in the first resource pool comprises a Physical Sidelink Feedback Channel (PSFCH).

In one embodiment, any of the multiple time-frequency resource blocks comprised in the first resource pool comprises multiple Resource Elements (REs).

In one embodiment, any of the multiple time-frequency resource blocks comprised in the first resource pool occupies a positive integer number of multicarrier symbol(s) in time domain, and any of the multiple time-frequency resource blocks comprised in the first resource pool occupies a positive integer number of subcarrier(s) in frequency domain.

In one embodiment, any of the multiple time-frequency resource blocks comprised in the first resource pool occupies a positive integer number of multicarrier symbol(s) in time domain, and any of the multiple time-frequency resource blocks comprised in the first resource pool occupies a positive integer number of Physical Resource Block(s) (PRB(s)) in frequency domain.

In one embodiment, any of the multiple time-frequency resource blocks comprised in the first resource pool occupies a positive integer number of multicarrier symbol(s) in time domain, and any of the multiple time-frequency resource blocks comprised in the first resource pool occupies a positive integer number of sub-channel(s) in frequency domain.

In one embodiment, any of the multiple time-frequency resource blocks comprised in the first resource pool occupies a positive integer number of slot(s) in time domain, and any of the multiple time-frequency resource blocks comprised in the first resource pool occupies a positive integer number of subcarrier(s) in frequency domain.

In one embodiment, any of the multiple time-frequency resource blocks comprised in the first resource pool occupies a positive integer number of slot(s) in time domain, and any of the multiple time-frequency resource blocks comprised in the first resource pool occupies a positive integer number of PRB(s) in frequency domain.

In one embodiment, any of the multiple time-frequency resource blocks comprised in the first resource pool occupies a positive integer number of slot(s) in time domain, and any of the multiple time-frequency resource blocks comprised in the first resource pool occupies a positive integer number of sub-channel(s) in frequency domain.

In one embodiment, time-domain resources occupied by any of the multiple time-frequency resource blocks comprised in the first resource pool are a positive integer number of slot(s).

In one embodiment, time-domain resources occupied by any of the multiple time-frequency resource blocks comprised in the first resource pool are a positive integer number of multicarrier symbol(s).

In one embodiment, frequency-domain resources occupied by any of the multiple time-frequency resource blocks comprised in the first resource pool are a positive integer number of sub-channel(s).

In one embodiment, frequency-domain resources occupied by any of the multiple time-frequency resource blocks comprised in the first resource pool are a positive integer number of PRB(s).

In one embodiment, frequency-domain resources occupied by any of the multiple time-frequency resource blocks comprised in the first resource pool are a positive integer number of carrier(s).

In one embodiment, the first resource pool comprises multiple time-domain resource blocks.

In one embodiment, the first resource pool comprises multiple time-domain resource blocks, and the multiple time-frequency resource blocks comprised in the first resource block belong to the multiple time-domain resource blocks comprised in the first resource pool in time domain.

In one embodiment, the first resource pool comprises multiple time-domain resource blocks, and any of the multiple time-frequency resource blocks comprised in the first resource block belongs to one of the multiple time-domain resource blocks comprised in the first resource pool in time domain.

In one embodiment, any of the multiple time-domain resource blocks comprised in the first resource pool occupies a positive integer number of slot(s).

In one embodiment, any of the multiple time-domain resource blocks comprised in the first resource pool occupies one slot.

In one embodiment, any of the multiple time-domain resource blocks comprised in the first resource pool occupies a positive integer number of multicarrier symbol(s).

In one embodiment, the first resource pool comprises multiple frequency-domain resource blocks.

In one embodiment, the first resource pool comprises multiple frequency-domain resource blocks, and the multiple time-frequency resource blocks comprised in the first resource pool belong to the multiple frequency-domain resource blocks comprised in the first resource pool.

In one embodiment, the first resource pool comprises multiple frequency-domain resource blocks, and any of the multiple time-frequency resource blocks comprised in the first resource block belongs to one of the multiple frequency-domain resource blocks comprised in the first resource pool in frequency domain.

In one embodiment, any of the multiple frequency-domain resource blocks comprised in the first resource pool occupies a positive integer number of subcarrier(s).

In one embodiment, any of the multiple time-domain resource blocks comprised in the first resource pool occupies a positive integer number of PRB(s).

In one embodiment, any of the multiple time-domain resource blocks comprised in the first resource pool occupies one PRB.

In one embodiment, any of the multiple frequency-domain resource blocks comprised in the first resource pool occupies a positive integer number of sub-channel(s).

In one embodiment, any of the multiple frequency-domain resource blocks comprised in the first resource pool occupies one sub-channel.

In one embodiment, the first resource pool comprises the X1 resource sub-pools.

In one embodiment, any of the X1 resource sub-pools comprises multiple time-frequency resource blocks.

In one embodiment, the multiple time-frequency resource blocks comprised in any of the X1 resource sub-pools belong to the first resource pool.

In one embodiment, any of the multiple time-frequency resource blocks comprised in any of the X1 resource sub-pools is one of the multiple time-frequency resource blocks comprised in the first resource pool.

In one embodiment, any of the X1 resource sub-pools comprises at least one time-frequency resource block in the multiple time-frequency resource blocks comprised in the first resource pool.

In one embodiment, at least one of the multiple time-frequency resource blocks comprised in any of the X1 resource sub-pools comprises a PSCCH.

In one embodiment, at least one of the multiple time-frequency resource blocks comprised in any of the X1 resource sub-pools comprises a PSSCH.

In one embodiment, at least one of the multiple time-frequency resource blocks comprised in any of the X1 resource sub-pools comprises a PSCCH and a PSSCH.

In one embodiment, at least one of the multiple time-frequency resource blocks comprised in any of the X1 resource sub-pools comprises a PSFCH.

In one embodiment, any two of the X1 resource sub-pools are orthogonal.

In one embodiment, any two of the X1 resource sub-pools are orthogonal in frequency domain.

In one embodiment, any two of the X1 resource sub-pools are orthogonal in time domain.

In one embodiment, any two of the X1 resource sub-pools are overlapping in time domain.

In one embodiment, any two of the X1 resource sub-pools are orthogonal in frequency domain and are overlapping in time domain.

In one embodiment, a first resource sub-pool and a second resource sub-pool are respectively any two resource sub-pools in the X1 resource sub-pools.

In one embodiment, any time-frequency resource block in the first resource sub-pool is different from a time-frequency resource block in the second resource sub-pool.

In one embodiment, time-domain resources occupied by a time-frequency resource block in the first resource sub-pool are the same as time-domain resources occupied by a time-frequency resource block in the second resource sub-pool, and frequency-domain resources occupied by a time-frequency resource block in the first resource sub-pool are different from frequency-domain resources occupied a time-frequency resource block in the second resource sub-pool.

In one embodiment, the multicarrier symbol in the present application is a Single-Carrier Frequency-Division Multiple Access (SC-FDMA) symbol.

In one embodiment, the multicarrier symbol in the present application is a Discrete Fourier Transform Spread Orthogonal Frequency Division Multiplexing (DFT-S-OFDM) symbol.

In one embodiment, the multicarrier symbol in the present application is a Frequency Division Multiple Access (FDMA) symbol.

In one embodiment, the multi-carrier symbol in the present application is a Filter Bank Multi-Carrier (FBMC) symbol.

In one embodiment, the multicarrier symbol in the present application is an Interleaved Frequency Division Multiple Access (IFDMA) symbol.

In one embodiment, the first signaling comprises all or partial a higher-layer signaling.

In one embodiment, the first signaling comprises all or part of a Radio Resource Control (RRC) layer signaling.

In one embodiment, the first signaling comprises all or part of a Multimedia Access Control (MAC) layer signaling.

In one embodiment, the first signaling comprises one or multiple fields in a PHY layer signaling.

In one embodiment, the first signaling comprises one or more fields in a Sidelink Control Information (SCI).

In one embodiment, for definition of SCI, refer to section 8.3 and section 8.4 in 3GPP TS38.212.

In one embodiment, the first signaling comprises one or more fields in a Downlink Control Information (DCI).

In one embodiment, a channel occupied by the first signaling comprises at least one of a PSCCH or a PSSCH.

In one embodiment, the first signaling indicates the first resource pool and the first priority.

In one embodiment, the first signaling indicates the first resource pool, the X1 resource sub-pools and the first priority.

In one embodiment, the first signaling indicates time-domain resources occupied by the first resource pool.

In one embodiment, the first signaling indicates frequency-domain resources occupied by the first resource pool.

In one embodiment, the first signaling indicates time-domain resources occupied by a resource sub-pool in the X1 resource pools.

In one embodiment, the first signaling indicates frequency-domain resources occupied by a resource sub-pool in the X1 resource pools.

In one embodiment, the first signaling indicates time-domain resources occupied by any resource sub-pool in the X1 resource pools.

In one embodiment, the first signaling indicates frequency-domain resources occupied by any resource sub-pool in the X1 resource pools.

In one embodiment, the first signaling indicates the first priority.

In one embodiment, the first signaling indicates time-domain resources occupied by the first resource pool, frequency-domain resources occupied by the first resource pool, time-domain resources occupied by any resource sub-pool in the X1 resource pools, frequency-domain resources occupied by any resource sub-pool in the X1 resource pools and the first priority.

In one embodiment, the target signal comprises a baseband signal.

In one embodiment, the target signal comprises an RF signal.

In one embodiment, the target signal comprises a radio signal.

In one embodiment, the target signal is transmitted on a PSCCH.

In one embodiment, the target signal is transmitted on a PSSCH.

In one embodiment, the target signal is transmitted on a PSCCH and a PSSCH.

In one embodiment, the target signal comprises all or part of a higher-layer signaling.

In one embodiment, the target signal comprises all or part of an RRC signaling.

In one embodiment, the target signal comprises all or part of a MAC layer signaling.

In one embodiment, the target signal comprises a target signaling.

In one embodiment, the target signaling comprises a positive integer number of bit(s).

In one embodiment, the first signaling group comprises a positive integer number of field(s).

In one embodiment, the target signaling is an SCI.

In one embodiment, the target signaling is a DCI.

In one embodiment, the target signal comprises a target bit block, and the target bit block comprises a positive integer number of bit(s).

In one embodiment, the target signal comprises the target signaling and the target bit block.

In one embodiment, the target signaling in the target signal is transmitted on a PSCCH, and the target bit block in the target signal is transmitted on a PSSCH.

In one embodiment, the target signaling in the target signal comprises one or multiple fields in an SCI, and the target bit block in the target signal is from a Sidelink Shared Channel (SL-SCH).

In one embodiment, the target signaling in the target signal is used to schedule the target bit block in the target signal.

In one embodiment, the target signaling in the target signal indicates time-frequency resources occupied by the target signal.

In one embodiment, the target signaling in the target signal indicates time-frequency resources occupied by the target signal, and time-frequency resources occupied by the target signal belong to the target time-frequency resource block.

In one embodiment, the target signaling in the target signal indicates time-frequency resources occupied by the target signal, and time-frequency resources occupied by the target signal are the target time-frequency resource block.

In one embodiment, the target signaling in the target signal indicates time-frequency resources occupied by the target bit block in the target signal, and time-frequency resources occupied by the target bit block belong to the target time-frequency resource block.

In one embodiment, the target signaling in the target signal indicates time-frequency resources occupied by the target bit block in the target signal, and time-frequency resources occupied by the target bit block is the target time-frequency resource block.

In one embodiment, the target signaling in the target signal indicates the target time-frequency resource block.

In one embodiment, the target signaling in the target signal indicates a modulation and coding mode that the target bit block in the target signal is through.

In one embodiment, the target signaling in the target signal indicates a Demodulation Reference Signal (DMRS) adopted by the target signal.

In one embodiment, the target signaling in the target signal indicates an MCS adopted by the target signal.

In one embodiment, the target signal does not comprise a target signaling, the target signaling is transmitted on a PSCCH, and the target signal is transmitted on a PSSCH.

In one embodiment, the target signaling and the target signal are transmitted on the target time-frequency resource block, and the target time-frequency resource block is a candidate time-frequency resource block in the candidate resource set.

In one embodiment, the target signaling comprises one or multiple fields in an SCI, and the target signal comprises the target bit block.

In one embodiment, the target signaling comprises one or multiple fields in an SCI, the target signal comprises the target bit block, and the target bit block is from an SL-SCH.

In one embodiment, the target signaling is used to schedule the target signal.

In one embodiment, the target bit block is used to generate the target signal, and the target bit block comprises a positive integer number of bit(s).

In one embodiment, the target bit block comprises a positive integer number of bit(s), and all or partial bits in the positive integer number of bit(s) comprised in the target bit block are used to generate the target signal.

In one embodiment, the target bit block comprises one CW.

In one embodiment, the target bit block comprises one CB.

In one embodiment, the target bit block comprises one CBG.

In one embodiment, the target bit block comprises one TB.

In one embodiment, the target signal is obtained after all or partial bits of the target bit block sequentially subjected to transport block-level Cyclic Redundancy Check (CRC) attachment, Code Block Segmentation, code block-level CRC attachment, Channel Coding, Rate Matching, Code Block Concatenation, Scrambling, Modulation, Layer Mapping, Antenna Port Mapping, Mapping to Physical Resource Blocks, Baseband Signal Generation and Modulation and Upconversion.

In one embodiment, the target signal is an output after the target bit block is sequentially subjected to a modulation mapper, a layer mapper, precoding, a resource element mapper, and multi-carrier symbol generation.

In one embodiment, the channel coding is based on a polar code.

In one embodiment, the channel coding is based on a Low-density Parity-Check (LDPC) code.

In one embodiment, the first priority is associated with the target signal.

In one embodiment, the first priority is a priority of the target signal.

In one embodiment, the first priority is a Layer 1 priority (L1 priority) of the target signal.

In one embodiment, the first priority is associated with the target bit block.

In one embodiment, the first priority is a priority of the target bit block.

In one embodiment, the first priority is a Layer 1 priority of the target bit block.

In one embodiment, the first priority is associated with the target bit block, and the target bit block is used to generate the target signal.

In one embodiment, the target signal comprises the target bit block, and the first priority is a priority of the target bit block.

In one embodiment, the target bit block is used to generate the target signal, the target signal is transmitted on the target time-frequency resource block, and the first priority is a priority of the target bit block.

In one embodiment, the target bit block is used to generate the target signal, the target signal is transmitted on the target time-frequency resource block, the first priority is a priority of the target bit block, and the target signaling is used to indicate the first priority.

In one embodiment, a size relationship of the first priority and the first priority threshold is used to determine whether the target bit block is used to generate the target signal.

In one embodiment, the first priority is associated with the target bit block, and a size relationship of the first priority and the first priority threshold is used to determine whether the target signal is transmitted in the first resource pool; when the first node determines transmitting the target signal in the first resource pool, the target bit block is used to generate the target signal; when the first node determines dropping transmitting the target signal in the first resource pool, the target bit block is not used to generate the target signal.

In one embodiment, the first priority is a non-negative integer.

In one embodiment, the first priority is a positive integer.

In one embodiment, the first priority is equal to a non-negative integer.

In one embodiment, the first priority is equal to a positive integer.

In one embodiment, the first priority is one of P non-negative integer(s), P being a positive integer.

In one embodiment, the first priority is one of P positive integer(s), P being a positive integer.

In one embodiment, the first priority is a positive integer from 1 to P, P being a positive integer.

In one embodiment, the first priority is equal to one of P non-negative integer(s), P being a positive integer.

In one embodiment, the first priority is equal to one of P positive integer(s), P being a positive integer.

In one embodiment, the first priority is equal to a positive integer from 1 to P, P being a positive integer.

In one embodiment, the first priority is one of P priority (priorities), P being a positive integer; the P priority(priorities) is(are respectively) equal to the P non-negative integer(s).

In one embodiment, the first priority is one of P priority (priorities), P being a positive integer; the P priority(priorities) is(are respectively) equal to the P positive integer(s).

In one embodiment, the first priority is one of P priority (priorities), P being a positive integer; the P priority(priorities) is(are respectively) equal to the P non-negative integer(s); a size relationship compared between the P priority(priorities) and the P non-negative integer(s) is monotonically decreased.

In one embodiment, the first priority is one of P priority (priorities), P being a positive integer; the P priority(priorities) is(are respectively) equal to the P positive integer(s); a size relationship compared between the P priority(priorities) and the P positive integer(s) is monotonically decreased.

In one embodiment, P is equal to 8.

In one embodiment, P is equal to 9.

In one embodiment, the first priority is a Layer 1 (L1) priority.

In one embodiment, the first priority is used for transmitting the target signal.

In one embodiment, the first priority is configured by a higher-layer signaling.

In one embodiment, the first priority is indicated by a higher-layer signaling.

In one embodiment, the first priority is indicated by an RRC layer signaling.

In one embodiment, the first priority is a field in an RRC IE.

In one embodiment, the first priority corresponds to a logical channel priority.

In one embodiment, the first priority corresponds to a priority of a logical channel transmitting sidelink data.

In one embodiment, the first priority indicates a priority of sidelink data passing through a logical channel.

In one embodiment, the first priority is equal to a first integer, the first integer is one of the P non-negative integer(s), the greater a value of the first integer in the P non-negative integer(s), the lower the priority of the sidelink data indicated by the first priority.

In one embodiment, the first priority indicates a priority of the target bit block, the first priority is equal to a first integer, and the first integer is one of the P non-negative integer(s), the smaller a value of the first integer in the P non-negative integer(s), the higher the priority of the target bit block indicated by the first priority.

In one embodiment, the first priority indicates a priority of the target bit block, the first priority is equal to a first integer, and the first integer is one of the P non-negative integer(s), the greater a value of the first integer in the P non-negative integer(s), the lower the priority of the target bit block indicated by the first priority.

In one embodiment, the first priority indicates a priority of the target bit block, the first priority is equal to a first integer, and the first integer is one of the P positive integer(s), the smaller a value of the first integer in the P positive integer(s), the higher the priority of the target bit block indicated by the first priority.

In one embodiment, the first priority indicates a priority of the target bit block, the first priority is equal to a first integer, and the first integer is one of the P positive integer(s), the greater a value of the first integer in the P positive integer(s), the lower the priority of the target bit block indicated by the first priority.

In one embodiment, the first priority is one of a first candidate priority or a second candidate priority, the first candidate priority is equal to a first candidate integer, the second candidate priority is equal to a second candidate integer, and the first candidate integer and the second candidate integer are respectively one of the P non-negative integers; when the first candidate integer is smaller than the second candidate integer, the first candidate priority is higher than the second candidate priority; when the first candidate integer is greater than the second candidate integer, the first candidate priority is lower than the second candidate priority; when the first candidate integer is equal to the second candidate integer, the first candidate priority is equal to the second candidate priority.

In one embodiment, the first priority is one of a first candidate priority or a second candidate priority, the first candidate priority is equal to a first candidate integer, the second candidate priority is equal to a second candidate integer, and the first candidate integer and the second candidate integer are respectively two of the P non-negative integers, a size relationship compared between the first candidate priority and the second candidate priority is monotonically decreasing with a size relationship compared between the first candidate integer and the second candidate integer.

In one embodiment, the X1 first-type thresholds are respectively X1 Reference Signal Receiving Power (RSRP).

In one embodiment, the X1 first-type thresholds are respectively X1 L1 RSRP.

In one embodiment, the X1 first-type thresholds are respectively X1 L3 RSRP.

In one embodiment, the X1 first-type thresholds are respectively X1 SL RSRP.

In one embodiment, the X1 first-type thresholds are respectively X1 Signal-to-Interference plus Noise Ratios (SINRs).

In one embodiment, the X1 first-type thresholds are respectively X1 L1 SINRs.

In one embodiment, the X1 resource sub-pools respectively correspond to the X1 first-type thresholds.

In one embodiment, the X1 first-type thresholds respectively correspond to the X1 resource sub-pools.

In one embodiment, the phrase of "the X1 resource sub-pools respectively corresponding to the X1 first-type thresholds" is the same as the phrase of "the X1 first-type thresholds respectively corresponding to the X1 resource sub-pools".

In one embodiment, the X1 first-type thresholds are configured by a higher layer of the first node.

In one embodiment, any of the X1 first-type thresholds are configured by a higher layer of the first node.

In one embodiment, the X1 first-type thresholds are respectively configured to the X1 resource sub-pools.

In one embodiment, the X1 first-type thresholds are used to determine the candidate resource set out of the first resource pool.

In one embodiment, the X1 first-type thresholds are respectively used to determine the candidate resource set out of the X1 resource sub-pools.

In one embodiment, the X1 first-type thresholds are respectively used to determine the at least one candidate resource subset comprised in the candidate resource set out of the X1 resource sub-pools.

In one embodiment, the X1 first-type thresholds are respectively used to determine X1 candidate resource subsets out of the X1 resource subsets, and any of the X1 candidate resource subsets belongs to the candidate resource set.

In one embodiment, the target threshold is one of the X1 first-type thresholds, the target resource sub-pool is one of the X1 resource sub-pools, the target resource subset is one of the at least one candidate resource subset comprised in the candidate resource set, and the target resource subset belongs to the target resource sub-pool; the target threshold corresponding to the target resource sub-pool refers to that the target threshold is used to determine the target resource subset out of the target resource sub-pool.

In one subembodiment of the above embodiment, the target resource sub-pool comprises the target resource subset.

In one subembodiment of the above embodiment, a candidate time-frequency resource block in the target resource subset is one of the multiple time-frequency resource blocks comprised in the target resource sub-pool.

In one subembodiment of the above embodiment, the target threshold is one of the X1 first-type thresholds corresponding to the target resource sub-pool.

In one subembodiment of the above embodiment, the target resource sub-pool is one of the X1 resource sub-pools corresponding to the target threshold.

In one embodiment, the target threshold is used to determine the target resource subset.

In one embodiment, the target threshold is used to determine the target resource subset out of the target resource sub-pool.

In one embodiment, the first priority is used to determine the X1 first-type thresholds.

In one embodiment, a first threshold list is one of multiple first-type threshold lists, any of the multiple first-type threshold lists comprises multiple first-type thresholds, and the first threshold list comprises the X1 first-type thresholds.

In one embodiment, a first threshold list is one of multiple first-type threshold lists, any of the multiple first-type threshold lists comprises multiple first-type thresholds, and the X1 first-type thresholds belong to the first threshold list.

In one embodiment, a first threshold list is one of multiple first-type threshold lists, any of the multiple first-type threshold lists comprises multiple first-type thresholds, and the first threshold list comprises the X1 first-type thresholds; the first priority is used to determine the first threshold list out of multiple first-type threshold lists.

In one embodiment, a first threshold list is one of multiple first-type threshold lists, any of the multiple first-type threshold lists comprises multiple first-type thresholds, and the X1 first-type thresholds belong to the first threshold list; the first priority is used to determine the first threshold list out of multiple first-type threshold lists.

In one embodiment, the first priority is used to determine an index of the first threshold list in the multiple first-type threshold lists.

In one embodiment, multiple priorities respectively correspond to the multiple first-type threshold lists, the first priority is one of the multiple priorities, the first threshold list is one of the multiple first-type threshold lists corresponding to the first priority; the first threshold list comprises the X1 first-type thresholds.

In one embodiment, the P priority(priorities) corresponds (respectively correspond) to the P first-type threshold list(s), the first priority is one of the P priority(priorities), the first threshold list is one of the P first-type threshold list(s) corresponding to the first priority; the first threshold list comprises the X1 first-type thresholds.

In one embodiment, the P priority(priorities) corresponds (respectively correspond) to the P first-type threshold list(s), the first priority is one of the P priority(priorities), the first threshold list is one of the P first-type threshold list(s) corresponding to the first priority; the X1 first-type thresholds belong to the first threshold list.

In one embodiment, the X1 first-type thresholds respectively belong to X1 second-type threshold lists, and any of the X1 second-type threshold lists comprises multiple first-type thresholds.

In one embodiment, X1 second-type thresholds respectively comprise the X1 first-type thresholds, and any of the X1 second-type threshold lists comprises multiple first-type thresholds.

In one embodiment, any of the X1 second-type threshold lists comprises one of the X1 first-type thresholds.

In one embodiment, any of the X1 first-type thresholds is one of multiple first-type thresholds comprised in one of the X1 second-type threshold lists.

In one embodiment, any two of the X1 first-type thresholds do not belong to a same one of the X1 second-type threshold lists.

In one embodiment, any two of the X1 first-type thresholds respectively belong to two of the X1 second-type threshold lists.

In one embodiment, any of X1 second-type threshold lists comprises multiple first-type thresholds, and any two of the X1 first-type thresholds are respectively one of the two second-type threshold lists.

In one embodiment, a second threshold list is one of X1 second-type threshold lists, any of the X1 second-type threshold lists comprises multiple first-type thresholds, and the second threshold list comprises one of the X1 first-type thresholds.

In one embodiment, any of X1 second-type threshold lists comprises P first-type threshold(s), the P first-type threshold (s) comprised in any of the X1 second-type threshold lists corresponds(respectively correspond) to the P priority(priorities), and the first priority is used to determine one of the X1 first-type thresholds out of the P first-type threshold(s) comprised in any of the X1 second-type threshold lists.

In one embodiment, any of X1 second-type threshold lists comprises P first-type threshold(s), a second threshold list is one of the X1 second-type threshold lists, P first-type threshold(s) in the second threshold list corresponds(respectively correspond) to the P priority(priorities), and the first priority is used to determine one of the X1 first-type thresholds out of P first-type threshold(s) in the second threshold list.

In one embodiment, any of X1 second-type threshold lists comprises P first-type threshold(s), a second threshold list is one of the X1 second-type threshold lists, P first-type threshold(s) in the second threshold list corresponds(respectively correspond) to the P priority(priorities), and the first priority is used to determine one of the X1 first-type thresholds corresponding to the first priority out of P first-type threshold(s) in the second threshold list.

Embodiment 2

Figure 2:
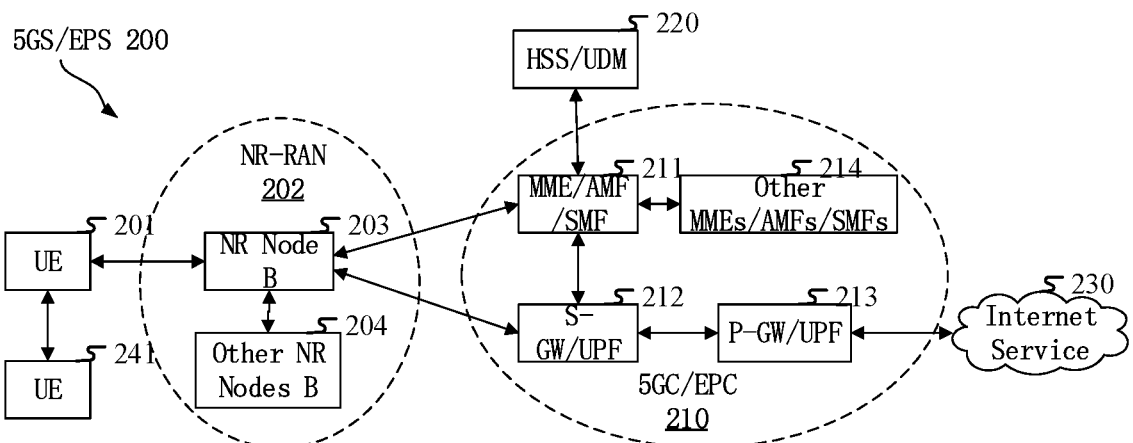
FIG. 2 illustrates a schematic diagram of a network architecture according to one embodiment of the present application.

Embodiment 2 illustrates a schematic diagram of a network architecture according to the present application, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN networks, examples of gNB 203 include satellites, aircrafts, or ground base stations relayed through satellites. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present application comprises the UE 201.

In one embodiment, the second node in the present application comprises the UE 241.

In one embodiment, the UE in the present application comprises the UE 201.

In one embodiment, the UE in the present application comprises the UE 241.

In one embodiment, the base station in the present application comprises the gNB 203.

In one embodiment, a transmitter of a first signaling in the present application comprises the gNB 203.

In one embodiment, a receiver of a first signaling in the present application comprises the UE 201.

In one embodiment, a receiver of a first signaling in the present application comprises the UE 241.

In one embodiment, a transmitter of a second signaling in the present application comprises the UE 241.

In one embodiment, a receiver of a second signaling in the present application comprises the UE 201.

In one embodiment, a transmitter of a target signal in the present application comprises the UE 201.

In one embodiment, a receiver of a target signal in the present application comprises the UE 241.

Embodiment 3

Figure 3:
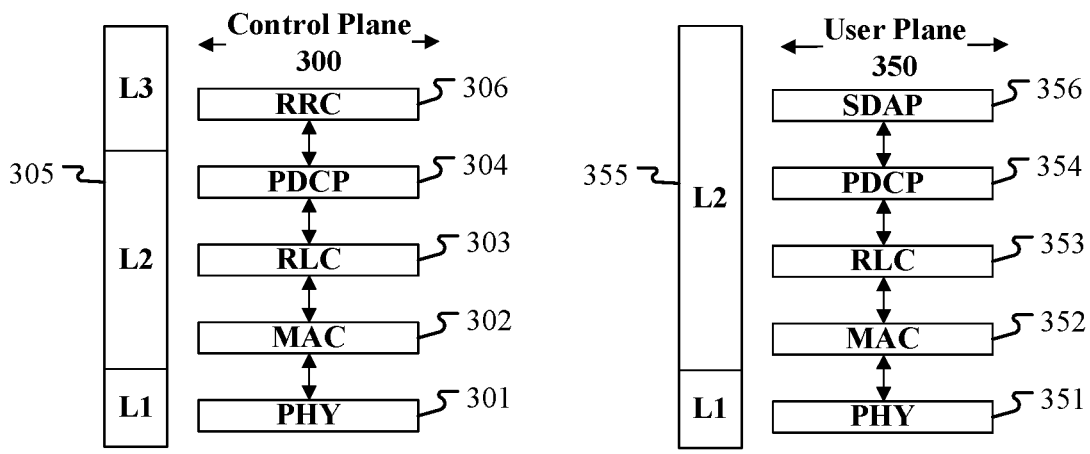
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE or RSU in V2X, vehicle equipment or On-Board Communication Unit) and a second node (gNB, UE or RSU in V2X, vehicle equipment or On-Board Communication Unit), or between two UEs is represented by three layers, which are respectively layer 1, layer 2 and layer 3. The layer 1 (L1) is the lowest layer and performs signal processing functions of various PHY layers. The L1 is called PHY 301 in the present application. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection and provides support for handover of a first node between second nodes. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel. The MAC sublayer 302 is also responsible for allocating between first nodes various radio resources (i.e., resource block) in a cell. The MAC sublayer 302 is also responsible for HARQ operations. In the control plane 300, the RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the RRC sublayer 306.

In one embodiment, the first signaling in the present application is generated by the MAC sublayer 302.

In one embodiment, the first signaling in the present application is generated by the PHY 301.

In one embodiment, the first signaling in the present application is transmitted to the PHY 301 via the MAC sublayer 302.

In one embodiment, the second signaling in the present application is generated by the PHY 301.

In one embodiment, the second signaling in the present application is generated by the MAC sublayer 302.

In one embodiment, the second signaling in the present application is generated by the RRC sublayer 306.

In one embodiment, the second signaling in the present application is transmitted to the PHY 301 via the MAC sublayer 302.

In one embodiment, the target signal in the present application is generated by the PHY 301.

In one embodiment, the target signal in the present application is generated by the MAC sublayer 302.

In one embodiment, the target signal in the present application is generated by the RRC sublayer 306.

In one embodiment, the target signal in the present application is transmitted to the PHY 301 via the MAC sublayer 302.

Embodiment 4

Figure 4:
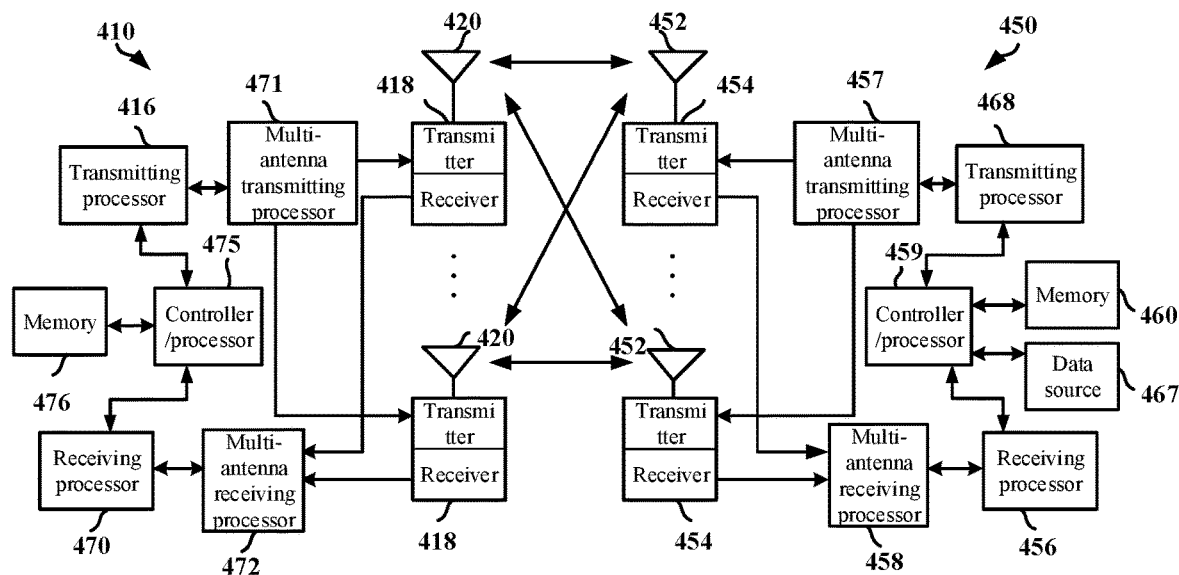
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE, and the second node is a UE.

In one subembodiment of the above embodiment, the first node is a relay node, and the second node is a UE.

In one subembodiment of the above embodiment, the first node is a relay node, and the second node is a relay node.

In one subembodiment of the above embodiment, the first node is a UE, and the second node is a relay node.

In one subembodiment of the above embodiment, the first node is a UE, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling, the first signaling indicates a first resource pool and X1 resource sub-pools, any of the X1 resource sub-pools belongs to the first resource pool, X1 being a positive integer greater than 1; determines a candidate resource set out of the first resource pool, the candidate resource set comprises at least one candidate time-frequency resource block; transmits a target signal on a target time-frequency resource block, the target time-frequency resource block is a candidate time-frequency resource block comprised in the candidate resource set; the candidate resource set comprises at least one candidate resource subset, a target resource subset is one of the at least one candidate resource subset comprised in the candidate resource set; a candidate time-frequency resource block in the target resource subset belongs to a target resource sub-pool, and the target resource sub-pool is one of the X1 resource sub-pools; the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and the target threshold is used to determine the target resource subset out of the target resource sub-pool.

In one embodiment, the second communication device 450 comprises a memory that stores a computer readable instruction program. The computer readable instruction program generates an action when executed by at least one processor. The action includes: receiving a first signaling, the first signaling indicating a first resource pool and X1 resource sub-pools, any of the X1 resource sub-pools belonging to the first resource pool, X1 being a positive integer greater than 1; determining a candidate resource set out of the first resource pool, the candidate resource set comprising at least one candidate time-frequency resource block; transmitting a target signal on a target time-frequency resource block, the target time-frequency resource block being a candidate time-frequency resource block comprised in the candidate resource set; the candidate resource set comprises at least one candidate resource subset, a target resource subset is one of the at least one candidate resource subset comprised in the candidate resource set; a candidate time-frequency resource block in the target resource subset belongs to a target resource sub-pool, and the target resource sub-pool is one of the X1 resource sub-pools; the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and the target threshold is used to determine the target resource subset out of the target resource sub-pool.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: receives a first signaling, the first signaling indicates a first resource pool and X1 resource sub-pools, any of the X1 resource sub-pools belongs to the first resource pool, X1 is a positive integer greater than 1; transmits a second signaling in a first resource pool, the second signaling indicates a second priority and a first time-frequency resource block, the first time-frequency resource block belongs to a target resource sub-pool, and the target resource sub-pool is one of the X1 resource sub-pools; receives a target signal on a target time-frequency resource block, the target time-frequency resource block belongs to the target resource sub-pool; the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and a size relationship of a measurement result in the first time-frequency resource block and the target threshold is used by a receiver of the second signaling to determine the target time-frequency resource block out of the target resource sub-pool; the first priority, the second priority and the target resource sub-pool are used together to determine the target threshold out of the X1 first-type thresholds.

In one embodiment, the first communication device 410 comprises a memory that stores a computer readable instruction program. The computer readable instruction program generates an action when executed by at least one processor. The action includes: receiving a first signaling, the first signaling indicating a first resource pool and X1 resource sub-pools, any of the X1 resource sub-pools belonging to the first resource pool, X1 being a positive integer greater than 1; transmitting a second signaling in a first resource pool, the second signaling indicating a second priority and a first time-frequency resource block, the first time-frequency resource block belonging to a target resource sub-pool, and the target resource sub-pool being one of the X1 resource sub-pools; and receiving a target signal on a target time-frequency resource block, the target time-frequency resource block belonging to the target resource sub-pool; the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and a size relationship of a measurement result in the first time-frequency resource block and the target threshold is used by a receiver of the second signaling to determine the target time-frequency resource block out of the target resource sub-pool; the first priority, the second priority and the target resource sub-pool are used together to determine the target threshold out of the X1 first-type thresholds.

In one embodiment, at least one of the antenna 452, the receiver 454, the multi-antenna receiving processor 458, the receiving processor 456, the controller/processor 459, the memory 460, or the data source 467 is used to receive a first signaling in the present application.

In one embodiment, at least one of the antenna 452, the receiver 454, the multi-antenna receiving processor 458, the receiving processor 456, the controller/processor 459, the memory 460, or the data source 467 is used to monitor a second signaling in a first resource pool in the present application.

In one embodiment, at least one of the antenna 452, the receiver 454, the multi-antenna receiving processor 458, the receiving processor 456, the controller/processor 459, the memory 460, or the data source 467 is used to measure in a first time-frequency resource block in the present application.

In one embodiment, at least one of the antenna 452, the receiver 454, the multi-antenna receiving processor 458, the receiving processor 456, the controller/processor 459, the memory 460, or the data source 467 is used to determine a candidate resource set out of a first resource pool in the present application.

In one embodiment, at least one of the antenna 452, the transmitter 454, the multi-antenna transmission processor 458, the transmitting processor 468, the controller/processor 459, the memory 460, or the data source 467 is used to transmit a target signal on a target time-frequency resource block in the present application.

In one embodiment, at least one of the antenna 420, the receiver 418, the multi-antenna receiving processor 472, the receiving processor 470, the controller/processor 475, or the memory 476 is used to receive a first signaling in the present application.

In one embodiment, at least one of the antenna 420, the transmitter 418, the multi-antenna transmitting processor 471, the transmitting processor 416, the controller/processor 475, or the memory 476 is used to transmit a second signaling in the present application.

In one embodiment, at least one of the antenna 420, the receiver 418, the multi-antenna receiving processor 472, the receiving processor 470, the controller/processor 475, or the memory 476 is used to receive a target signal on a target time-frequency resource block in the present application.

Embodiment 5

Figure 5:
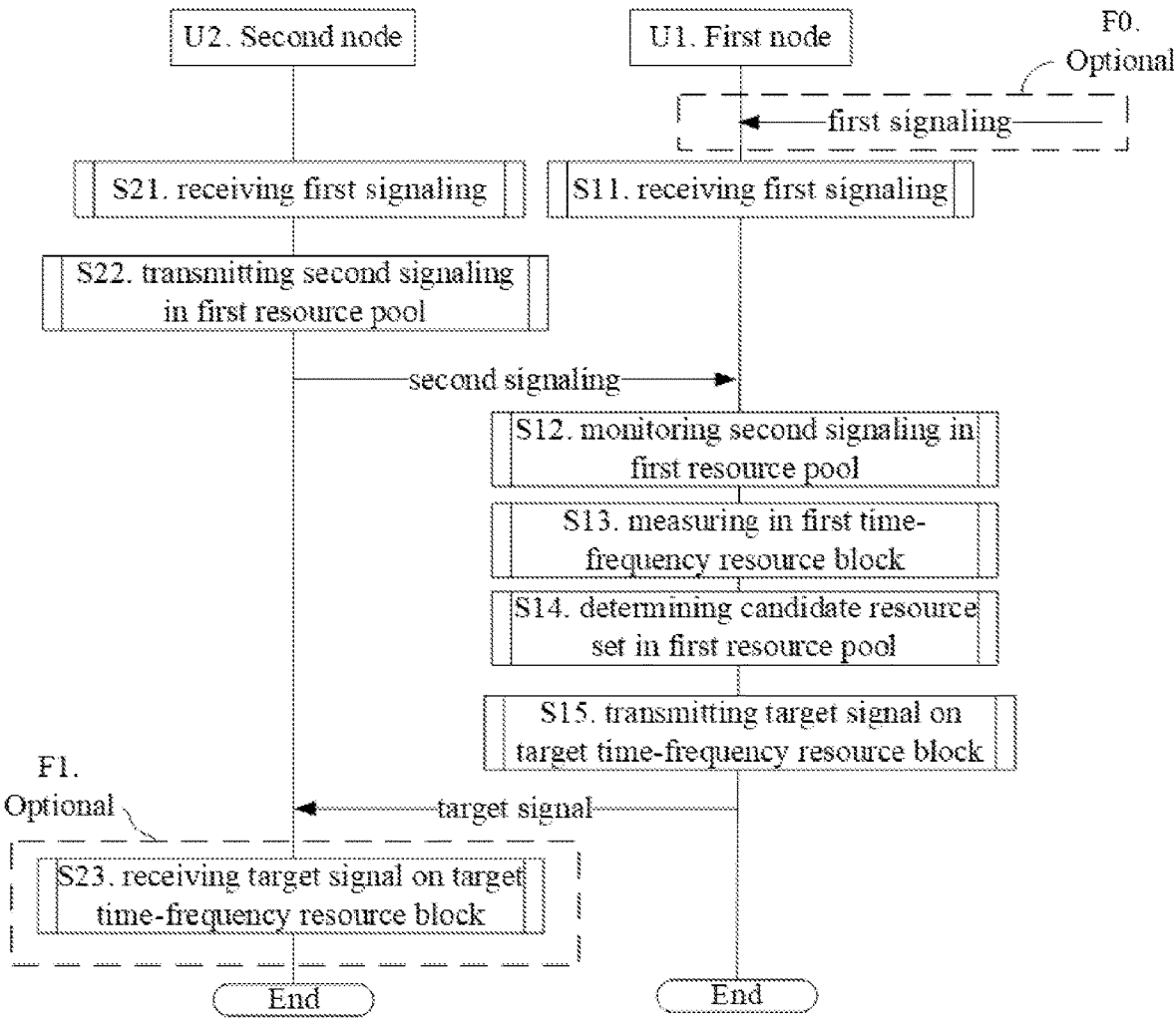
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a first node U1 and a second node U2 are in communications via an air interface.

The first node U1 receives a first signaling in step S11; monitors a second signaling in a first resource pool in step S12; measures in a first time-frequency resource block in step S13; determines a candidate resource set out of a first resource pool in step S14; and transmits a target signal on a target time-frequency resource block in step S15.

The second node U2 receives a first signaling in step S21; transmits a second signaling in a first resource pool in step S22; and receives a target signal on a target time-frequency resource block in step S23.

In embodiment 5, the first signaling indicates a first resource pool and X1 resource sub-pools, any of the X1 resource sub-pools belongs to the first resource pool, X1 is a positive integer greater than 1, and a target resource sub-pool is one of the X1 resource sub-pools; the second signaling indicates a second priority and a first time-frequency resource block; the first time-frequency resource block belongs to the target resource sub-pool; the candidate resource set comprises at least one candidate time-frequency resource block; the target time-frequency resource block is a candidate time-frequency resource block comprised in the candidate resource set; the candidate resource set comprises at least one candidate resource subset, a target resource subset is one of the at least one candidate resource subset comprised in the candidate resource set;

a candidate time-frequency resource block in the target resource subset belongs to a target resource sub-pool; the first signaling indicates a first priority, and the first priority is used to determine X1 first-type thresholds; the X1 resource sub-pools respectively correspond to the X1 first-type thresholds; the first priority, the second priority and the target resource sub-pool are used together by the first node U1 to determine a target threshold out of the X1 first-type thresholds; the target threshold is one of the X1 first-type thresholds corresponding to the target resource sub-pool, and the target threshold is used by the first node U1 to determine the target resource subset out of the target resource sub-pool; the first time-frequency resource block is associated with a second time-frequency resource block, the second time-frequency resource block belongs to the target resource sub-pool, and the first time-frequency resource block and the second time-frequency resource block are orthogonal in time domain; a size relationship of a measurement result in the first time-frequency resource block and the target threshold is used by the first node U1 to determine whether the second time-frequency resource block belongs to the target resource subset.

In one embodiment, the X1 first-type thresholds belong to one of multiple first-type threshold lists; the first priority and the second priority are used together by the first node U1 to determine a first-type threshold list to which the X1 first-type thresholds belong out of the multiple first-type threshold lists; the target resource sub-pool is used by the first node U1 to determine the target threshold out of the X1 first-type thresholds.

In one embodiment, the X1 first-type thresholds respectively belong to X1 second-type threshold lists, and the target threshold belongs to one of the X1 second-type threshold lists; the target resource sub-pool is used by the first node U1 to determine a second-type threshold list to which the target threshold belongs out of the X1 second-type threshold lists; the first priority and the second priority are used together by the first node U1 to determine the target threshold out of a second-type threshold list to which the target threshold belongs.

In one embodiment, a first reference threshold is one of multiple reference thresholds, and the first reference threshold is one of the X1 first-type thresholds; the first priority and the second priority are used together by the first node U1 to determine the first reference threshold out of the multiple reference thresholds, the target resource sub-pool is used by the first node U1 to determine a first offset, and the first reference threshold and the first offset are used together by the first node U1 to determine the target threshold.

In one embodiment, the X1 resource sub-pools comprise a first resource sub-pool and a second resource sub-pool; a first threshold is a first-type threshold corresponding to the first resource sub-pool among the X1 first-type thresholds, and a second threshold is a first-type threshold corresponding to the second resource sub-pool among the X1 first-type thresholds; the first threshold is used by the first node U1 to determine a first candidate resource subset out of the first resource sub-pool, and the second threshold is used by the first node U1 to determine a second candidate resource subset out of the second resource sub-pool; both the first candidate resource subset and the second candidate resource subset belong to the candidate resource set; the first threshold is higher than the second threshold; the target time-frequency resource block is preferentially selected from a former of the first candidate resource subset and the second candidate resource subset.

In one embodiment, the X1 resource sub-pools comprise a first resource sub-pool and a second resource sub-pool; a first threshold is a first-type threshold corresponding to the first resource sub-pool among the X1 first-type thresholds, and a second threshold is a first-type threshold corresponding to the second resource sub-pool among the X1 first-type thresholds; the first threshold is higher than the second threshold; the first threshold is used by the first node U1 to determine a first candidate resource subset out of the first resource sub-pool, the first candidate resource subset belongs to the candidate resource set, and the first candidate resource subset comprises Q1 candidate time-frequency resource blocks, Q1 being a positive integer greater than 1; a size relationship of Q1 and a first value is used by the first node U1 to determine whether the candidate resource set is orthogonal to the second resource sub-pool.

In one embodiment, the first node U1 and the second node U2 are in communications via a PC5 interface.

In one embodiment, the step in the box marked by F0 in FIG. 5 exists.

In one embodiment, the step in the box marked by F0 in FIG. 5 does not exist.

In one embodiment, when a transmitter of the first signaling is a base station, the step in the box marked by F0 in FIG. 5 exists; when a transmitter of the first signaling is a higher layer of the first node U1, the step in the box marked by F0 in FIG. 5 does not exist.

In one embodiment, the first signaling is a physical layer transmitted by a higher layer of the first node U1 to the first node U1.

In one embodiment, the first signaling is transmitted by a higher layer of the first node U1.

Embodiment 6

Figure 6:
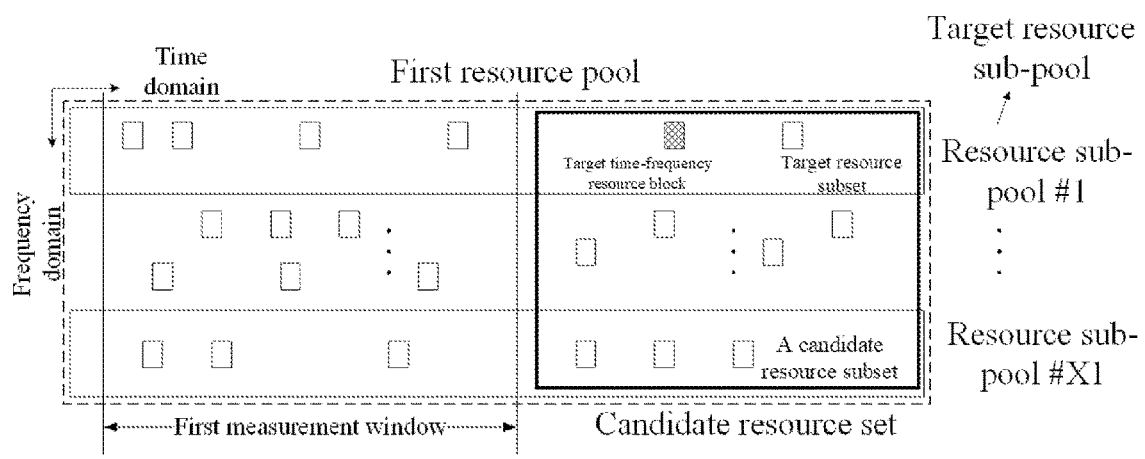
FIG. 6 illustrates a schematic diagram of relations among a first resource pool, X1 resource sub-pools, a candidate resource set and a target resource sub-pool, a target resource subset, a target time-frequency resource block according to one embodiment of the present application.

Embodiment 6 illustrates a schematic diagram of relations among a first resource pool, X1 resource sub-pools, a candidate resource set and a target resource sub-pool, a target resource subset, a target time-frequency resource block according to one embodiment of the present application, as shown in FIG. 6. In FIG. 6, the big dotted rectangle represents a first resource pool in the present application; the rectangle in the big dotted rectangle represents time-frequency resource blocks in the first resource pool; the thin solid line rectangle represents a resource sub-pool in X1 resource sub-pools in the present application; the thick solid rectangle represents a candidate resource set in the present application; the cross-line filled rectangle represents a target time-frequency resource block in the present application.

In embodiment 6, the first resource pool comprises the X1 resource sub-pools, X1 being a positive integer greater than 1; the target resource sub-pool is one of the X resource sub-pools; the first resource pool comprises a candidate resource set; the candidate resource set comprises at least one candidate resource subset; any candidate resource subset in the at least one candidate resource subset comprised in the candidate resource set belongs to the first resource pool; the target resource subset is one of the at least one candidate resource subset comprised in the candidate resource set; the candidate resource set comprises at least one candidate time-frequency resource block; the target time-frequency resource block is one of the at least one candidate time-frequency resource block comprised in the candidate resource set.

In one embodiment, the target resource sub-pool is one of the X1 resource sub-pools.

In one embodiment, the target resource sub-pool comprises multiple time-frequency resource blocks.

In one embodiment, any of the multiple time-frequency resource blocks comprised in the target resource sub-pool is one of the multiple time-frequency resource blocks comprised in the first resource pool.

In one embodiment, the first resource pool comprises the candidate resource set.

In one embodiment, the candidate resource set comprises at least one candidate time-frequency resource block.

In one embodiment, the candidate resource set comprises multiple candidate time-frequency resource blocks.

In one embodiment, the candidate resource set comprises a candidate time-frequency resource block.

In one embodiment, one of the at least one candidate time-frequency resource block comprised in the candidate resource set is one of the multiple time-frequency resource blocks comprised in the first resource pool.

In one embodiment, any of the multiple candidate time-frequency resource blocks comprised in the candidate resource set is one of the multiple time-frequency resource blocks comprised in the first resource pool.

In one embodiment, the candidate resource set comprises at least one candidate resource subset.

In one embodiment, the candidate resource set comprises multiple candidate resource subsets.

In one embodiment, the candidate resource set comprises a candidate resource subset.

In one embodiment, one of the at least one candidate resource subset comprised in the candidate resource set comprises at least one candidate time-frequency resource block.

In one embodiment, any of the multiple candidate resource subsets comprised in the candidate resource set comprises at least one candidate time-frequency resource block.

In one embodiment, a candidate time-frequency resource block in one of the at least one candidate resource subset comprised in the candidate resource set is one of the at least one candidate time-frequency resource block comprised in the candidate resource set.

In one embodiment, the target resource subset belongs to the candidate resource set.

In one embodiment, the candidate resource set comprises the target resource subset.

In one embodiment, the target resource subset is one of the at least one candidate resource subset comprised in the candidate resource set.

In one embodiment, the target resource subset is one of the multiple candidate resource subsets comprised in the candidate resource set.

In one embodiment, the target resource subset comprises at least one candidate time-frequency resource block.

In one embodiment, the target resource subset comprises multiple candidate time-frequency resource blocks.

In one embodiment, the target resource subset comprises one candidate time-frequency resource block.

In one embodiment, one of the at least one candidate time-frequency resource block comprised in the target resource subset is a candidate time-frequency resource block in the candidate resource set.

In one embodiment, any of the multiple candidate time-frequency resource blocks comprised in the target resource subset is one of the multiple time-frequency resource blocks comprised in the candidate resource set.

In one embodiment, the target resource subset belongs to the target resource sub-pool.

In one embodiment, the target resource sub-pool comprises the target resource subset.

In one embodiment, the at least one candidate time-frequency resource block comprised in the target resource subset belongs to the target resource sub-pool.

In one embodiment, the multiple candidate time-frequency resource blocks comprised in the target resource subset belongs to the target resource sub-pool.

In one embodiment, any of the at least one candidate time-frequency resource block comprised in the target resource subset is one of the multiple time-frequency resource blocks comprised in the target resource sub-pool.

In one embodiment, any of the multiple candidate time-frequency resource blocks comprised in the target resource subset is one of the multiple time-frequency resource blocks comprised in the target resource sub-pool.

In one embodiment, the target time-frequency resource block is one of the at least one candidate time-frequency resource block comprised in the candidate resource set.

In one embodiment, the target time-frequency resource block is one of the multiple candidate time-frequency resource blocks comprised in the candidate resource set.

In one embodiment, the target time-frequency resource block is one of the at least one candidate time-frequency resource block comprised in one of the at least one candidate resource subset comprised in the candidate resource set.

In one embodiment, the target resource subset comprises the target time-frequency resource block.

In one embodiment, the target time-frequency resource block is one of the at least one candidate time-frequency resource block comprised in the target resource subset.

In one embodiment, the target time-frequency resource block is one of the multiple candidate time-frequency resource blocks comprised in the target resource subset.

In one embodiment, the target time-frequency resource block does not belong to the target resource subset.

In one embodiment, the target time-frequency resource block is different from any of the at least one candidate time-frequency resource block comprised in the target resource subset.

In one embodiment, the target time-frequency resource block is different from any of the multiple candidate time-frequency resource blocks comprised in the target resource subset.

In one embodiment, the target time-frequency resource block comprises a PSCCH.

In one embodiment, the target time-frequency resource block comprises a PSSCH.

In one embodiment, the target time-frequency resource block comprises a PSCCH and a PSSCH.

In one embodiment, the target time-frequency resource block comprises a PSFCH.

Embodiment 7

Figure 7:
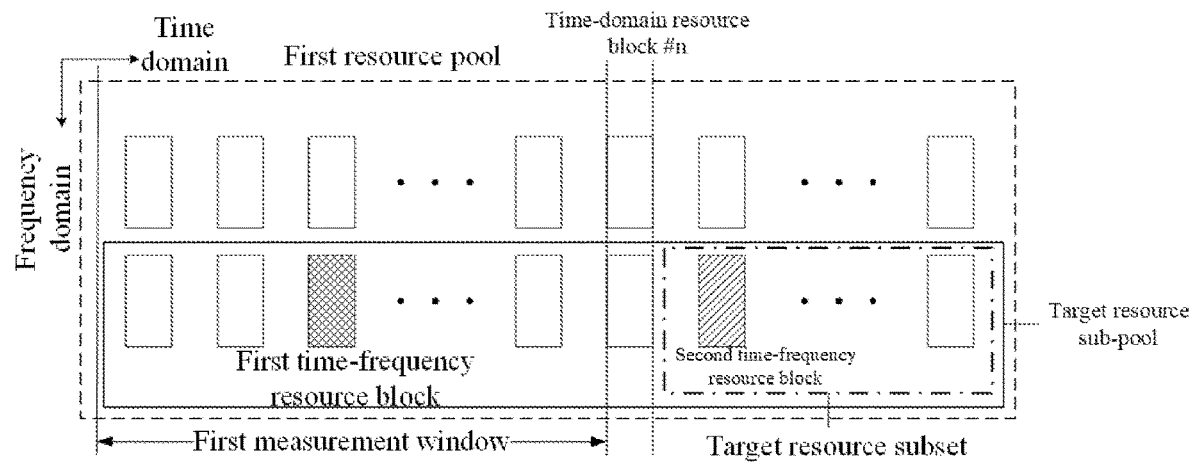
FIG. 7 illustrates a schematic diagram of relations among a first resource pool, a target resource sub-pool, a first time-frequency resource block, a second time-frequency resource block and a target resource subset according to one embodiment of the present application.

Embodiment 7 illustrates a schematic diagram of relations among a first resource pool, a target resource sub-pool, a first time-frequency resource block, a second time-frequency resource block and a target resource subset according to one embodiment of the present application, as shown in FIG. 7. In FIG. 7, the big dotted rectangle represents a first resource pool in the present application; rectangles in the big dotted rectangle represents time-frequency resource blocks in the first resource pool; the thin solid rectangle represents a target resource sub-pool in the present application; the dot-dashed line rectangle represents a target resource subset in the present application; the cross line-filled rectangle represents a first time-frequency resource block in the present application; the slash-filled rectangle represents a second time-frequency resource block in the present application.

In embodiment 7, a second signaling is monitored in the first resource pool, the second signaling indicates a second priority and a first time-frequency resource block; a measurement is performed in the first time-frequency resource block, the first time-frequency resource block belongs to the target resource sub-pool; the first priority, the second priority and the target resource sub-pool are used together to determine the target threshold; the first time-frequency resource block is associated with a second time-frequency resource block, the second time-frequency resource block belongs to the target resource sub-pool, and the first time-frequency resource block and the second time-frequency resource block are orthogonal in time domain.

In one embodiment, the second signaling comprises one or more fields of a PHY layer signaling.

In one embodiment, the second signaling comprises one or more fields of SCI.

In one embodiment, the second signaling is an SCI.

In one embodiment, the second signaling comprises one or more fields in a DCI.

In one embodiment, the second signaling comprises all or part of a higher-layer signaling.

In one embodiment, the second signaling comprises all or part of an RRC signaling.

In one embodiment, the second signaling comprises all or part of a MAC layer signaling.

In one embodiment, a channel occupied by the second signaling comprises at least one of a PSCCH or a PSSCH.

In one embodiment, a channel occupied by the second signaling comprises a PSCCH.

In one embodiment, the second signaling indicates the second priority and a first time-frequency resource block.

In one embodiment, the second signaling indicates the second priority.

In one embodiment, the second signaling indicates time-domain resources occupied by the first time-frequency resource block.

In one embodiment, the second signaling indicates frequency-domain resources occupied by the first time-frequency resource block.

In one embodiment, the second signaling indicates time-domain resources occupied by the first time-frequency resource block, frequency-domain resources occupied by the first time-frequency resource block and the second priority.

In one embodiment, the second priority is associated with a radio signal transmitted on the first time-frequency resource block.

In one embodiment, the second priority is a priority of a radio signal transmitted on the first time-frequency resource block.

In one embodiment, the second priority is an L1 priority of a radio signal transmitted on the first time-frequency resource block.

In one embodiment, the second priority is a non-negative integer.

In one embodiment, the second priority is a positive integer.

In one embodiment, the second priority is equal to a non-negative integer.

In one embodiment, the second priority is equal to a positive integer.

In one embodiment, the second priority and the first priority are respectively two of P non-negative integers, P being a positive integer.

In one embodiment, the second priority and the first priority are respectively one of P positive integers, P being a positive integer.

In one embodiment, the second priority and the first priority are respectively a positive integer from 1 to P, P being a positive integer.

In one embodiment, the second priority is higher than the first priority.

In one embodiment, the second priority is lower than the first priority.

In one embodiment, the second priority is equal to the first priority.

In one embodiment, the first priority is equal to a first integer, the second priority is equal to a second integer, and the first integer and the second integer are respectively one of P non-negative integers, P being a positive integer.

In one embodiment, the first priority is equal to a first integer, the second priority is equal to a second integer, and the first integer and the second integer are respectively one of P positive integers, P being a positive integer.

In one embodiment, the first priority is equal to a first integer, the second priority is equal to a second integer, and the first integer and the second integer are respectively a positive integer from 1 to P, P being a positive integer.

In one embodiment, the second integer is greater than the first integer.

In one embodiment, the second integer is less than the first integer.

In one embodiment, the second integer is equal to the first integer.

In one embodiment, the first priority and the second priority are respectively one of P priorities, P being a positive integer; the P priorities are respectively equal to the P non-negative integers.

In one embodiment, the first priority and the second priority are respectively one of P priorities, P being a positive integer; the P priorities are respectively equal to the P positive integers.

In one embodiment, the first priority and the second priority are respectively one of P priorities, P being a positive integer; the P priorities are respectively equal to the P non-negative integers; a size relationship compared between the P priorities and the P non-negative integers is monotonically decreased.

In one embodiment, the first priority and the second priority are respectively one of P priorities, P being a positive integer; the P priorities are respectively equal to the P positive integers; a size relationship compared between the P priorities and the P positive integers is monotonically decreased.

In one embodiment, the first integer and the second integer are respectively one of the P non-negative integers.

In one embodiment, the first integer and the second integer are respectively one of the P positive integers.

In one embodiment, the first integer is less than the second integer, and the first priority is higher than the second priority.

In one embodiment, the first integer is equal to the second integer, and the first priority is equal to the second priority.

In one embodiment, the first integer is greater than the second integer, and the first priority is lower than the second priority.

In one embodiment, the first priority and the second priority are both L1 priorities.

In one embodiment, the first priority is an L1 priority of the target signal, and the second priority is an L1 priority of a radio signal transmitted on the first time-frequency resource block.

In one embodiment, the first priority is configured by a higher-layer signaling, and the second priority is indicated by the second signaling.

In one embodiment, the first priority is indicated by an RRC layer signaling, and the second priority is indicated by an SCI.

In one embodiment, the first priority is a field in an RRC IE, and the second priority is a field in an SCI.

In one embodiment, the second priority corresponds to a logical channel priority.

In one embodiment, the second priority corresponds to a priority of a logical channel transmitting sidelink data.

In one embodiment, the second priority indicates a priority of sidelink data passing through a logical channel, and the sidelink data passing through the logical channel is transmitted on the first time-frequency resource block.

In one embodiment, the second priority is equal to a second integer, the second integer is one of the P non-negative integers, the greater a value of the second integer in the P non-negative integers, the lower the priority of the sidelink data transmitted on the first time-frequency resource block indicated by the second priority.

In one embodiment, the second priority is equal to a second integer, the second integer is one of the P non-negative integers, the less a value of the second integer in the P non-negative integers, the higher the priority of the sidelink data transmitted on the first time-frequency resource block indicated by the second priority.

In one embodiment, the second priority indicates a priority of a radio signal transmitted on the first time-frequency resource block, the second priority is equal to a second integer, the second integer is one of the P non-negative integers, and the greater a value of the second integer in the P non-negative integers, the lower the priority of a radio signal transmitted on the first time-frequency resource block indicated by the second priority.

In one embodiment, the second priority indicates a priority of a radio signal transmitted on the first time-frequency resource block, the second priority is equal to a second integer, the second integer is one of the P non-negative integers, and the less a value of the second integer in the P non-negative integers, the higher the priority of a radio signal transmitted on the first time-frequency resource block indicated by the second priority.

In one embodiment, the second priority indicates a priority of a radio signal transmitted on the first time-frequency resource block, the second priority is equal to a second integer, the second integer is one of the P positive integers, and the greater a value of the second integer in the P positive integers, the lower the priority of a radio signal transmitted on the first time-frequency resource block indicated by the second priority.

In one embodiment, the second priority indicates a priority of a radio signal transmitted on the first time-frequency resource block, the second priority is equal to a second integer, the second integer is one of the P positive integers, and the less a value of the second integer in the P non-negative integers, the higher the priority of a radio signal transmitted on the first time-frequency resource block indicated by the second priority.

In one embodiment, the second priority is one of a third candidate priority or a fourth candidate priority, the third candidate priority is equal to a third candidate integer, the fourth candidate priority is equal to a fourth candidate integer, and the third candidate integer and the fourth candidate integer are respectively one of the P non-negative integers; when the third candidate integer is smaller than the fourth candidate integer, the third candidate priority is higher than the fourth candidate priority; when the third candidate integer is greater than the fourth candidate integer, the third candidate priority is lower than the fourth candidate priority; when the third candidate integer is equal to the fourth candidate integer, the third candidate priority is equal to the fourth candidate priority.

In one embodiment, the second priority is one of a third candidate priority or a fourth candidate priority, the third candidate priority is equal to a third candidate integer, the fourth candidate priority is equal to a fourth candidate integer, and the third candidate integer and the fourth candidate integer are respectively one of the P non-negative integers, a size relationship compared between the third candidate priority and the fourth candidate priority is monotonically decreasing with a size relationship compared between the third candidate integer and the fourth candidate integer.

In one embodiment, the second signaling is transmitted on at least one of the multiple time-frequency resource blocks comprised in the first resource pool.

In one embodiment, the second signaling is transmitted on one of the multiple time-frequency resource blocks comprised in the first resource pool.

In one embodiment, the second signaling is not transmitted on any of the multiple time-frequency resource blocks comprised in the first resource pool.

In one embodiment, monitoring the second signaling in the first resource pool comprises monitoring the second signaling in the multiple time-frequency resource blocks comprised in the first resource pool.

In one embodiment, monitoring the second signaling in the first resource pool comprises monitoring the second signaling on any of the multiple time-frequency resource blocks comprised in the first resource pool.

In one embodiment, monitoring the second signaling in the first resource pool comprises monitoring the second signaling within a first measurement window of the first resource pool.

In one embodiment, time-domain resources occupied by M1 time-frequency resource block(s) in the multiple time-frequency resource blocks comprised in the first resource pool are within the first measurement window.

In one embodiment, the first measurement window comprises time-domain resources occupied by M1 time-frequency resource block(s) among the multiple time-frequency resource blocks comprised in the first resource pool in time domain.

In one embodiment, monitoring the second signaling in the first resource pool comprises monitoring the second signaling in the M1 time-frequency resource block(s) in the first resource pool.

In one embodiment, monitoring the second signaling in the first resource pool comprises monitoring the second signaling on any of the M1 time-frequency resource block(s) in the first resource pool.

In one embodiment, the first measurement window comprises multiple time-domain resource blocks.

In one embodiment, any of the multiple time-domain resource blocks comprised in the first measurement window belongs to one of the multiple time-domain resource blocks comprised in the first resource pool.

In one embodiment, any of the multiple time-domain resource blocks comprised in the first measurement window is a slot.

In one embodiment, any of the multiple time-domain resource blocks comprised in the first measurement window is a sub-frame.

In one embodiment, any of the multiple time-domain resource blocks comprised in the first measurement window is a positive integer number of multicarrier symbol(s).

In one embodiment, a time length of the first measurement window is 1000 milliseconds.

In one embodiment, a time length of the first measurement window is 100 milliseconds.

In one embodiment, the phrase of "monitoring a second signaling in a first resource pool" refers to a blind detection-based reception in the multiple time-frequency resource blocks comprised in the first resource pool, that is, the first node receives a signal on the M1 time-frequency resource block(s) within the first measurement window and executes a decoding operation, and if the decoding is determined correct according to a CRC bit, it is judged that the second signaling is detected; otherwise it is judged that the second signaling is not detected.

In one embodiment, the phrase of "monitoring a second signaling in a first resource pool" refers to a blind detection-based reception in a format of the second signaling in the multiple time-frequency resource blocks comprised in the first resource pool, that is, the first node receives a signal in a format of the second signaling on the M1 time-frequency resource blocks within the first measurement window and executes a decoding operation, and if the decoding is determined correct according to a CRC bit, it is judged that the second signaling is detected; otherwise it is judged that the second signaling is not detected.

In one embodiment, the phrase of "monitoring a second signaling in a first resource pool" refers to a coherent detection-based reception in the multiple time-frequency resource blocks comprised in the first resource pool, that is, the first node performs a coherent reception on a radio signal with an RS sequence corresponding to a DMRS of the second signaling on the M1 time-frequency resource blocks within the first measurement window, and measures energy of a signal acquired after the coherent reception; if the energy of the signal acquired after the coherent reception is greater than a first given threshold, it is judged that the second signaling is detected; otherwise it is judged that the second signaling is not detected.

In one embodiment, the phrase of "monitoring a second signaling in a first resource pool" refers to an energy detection-based reception in the multiple time-frequency resource blocks comprised in the first resource pool, that is, the first node senses energy of a radio signal on the M1 time-frequency resource block(s) in the first measurement window and averages it in time to acquire received energy; if the received energy is greater than a second given threshold, it is judged that the second signaling is detected; otherwise it is judged that the second signaling is not detected.

In one embodiment, the second signaling being detected refers to that after the second signaling is received based on a blind detection, and is determined to be decoded correctly based on a CRC bit.

In one embodiment, the second signaling not being detected refers to that after the second signaling is received based on a blind detection, and is determined to be decoded correctly based on a CRC bit.

In one embodiment, the first priority, the second priority and the target resource sub-pool are used together to determine the target threshold.

In one embodiment, a combination of the first priority, the second priority and the target resource sub-pool are used together to determine the target threshold.

In one embodiment, the first priority, the second priority and the target resource sub-pool are used together to determine the target threshold out of the X1 first-type thresholds.

In one embodiment, a combination of the first priority, the second priority and the target resource sub-pool are used together to determine the target threshold out of the X1 first-type thresholds.

In one embodiment, the first priority and the second priority are used together to determine the X1 first-type thresholds, and the target resource sub-pool is used to determine the target threshold out of the X1 first-type thresholds.

In one embodiment, the first priority and the second priority are used together to determine the X1 first-type thresholds, and an index of the target resource sub-pool in the X1 resource sub-pools is equal to an index of the target threshold in the X1 first-type thresholds.

In one embodiment, a first threshold list is one of multiple first-type threshold lists, any of the multiple first-type threshold lists comprises multiple first-type thresholds, and the first threshold list comprises the X1 first-type thresholds; the first priority and the second priority are used to determine the first threshold list out of multiple first-type threshold lists.

In one embodiment, a first threshold list is one of multiple first-type threshold lists, any of the multiple first-type threshold lists comprises multiple first-type thresholds, and the X1 first-type thresholds belong to the first threshold list; the first priority and the second priority are used to determine the first threshold list out of multiple first-type threshold lists.

In one embodiment, the first priority and the second priority are used together to determine an index of the first threshold list in the multiple first-type threshold lists.

In one embodiment, a combination of the first priority and the second priority is used together to determine an index of the first threshold list in the multiple first-type threshold lists.

In one embodiment, an index of the first threshold list in the multiple first threshold lists is equal to the first priority minus 1 then multiplied by 8 and then plus the second priority.

In one embodiment, the first priority and the second priority are used together to determine the first threshold list out of the multiple first-type threshold lists, and the target resource sub-pool is used to determine the target threshold out of the X1 first-type thresholds comprised in the first threshold list.

In one embodiment, the first threshold list is one of the multiple first-type threshold lists corresponding to a combination of the first priority and the second priority, and the target threshold is one of the X1 first-type thresholds comprised in the first threshold list.

In one embodiment, the first priority and the second priority are used together to determine an index of the first threshold list in the multiple first-type threshold lists, and the target resource sub-pool is used to determine an index of the target threshold in the X1 first-type thresholds comprised in the first threshold list.

In one embodiment, a combination of the first priority and the second priority is used to determine an index of the first threshold list in the multiple first-type threshold lists, and an index of the target resource sub-pool in the X1 resource sub-pools is equal to an index of the target threshold in the X1 first-type thresholds comprised in the first threshold list.

In one embodiment, an index of the first threshold list in the multiple first-type threshold lists is equal to the first priority minus 1 then multiplied by 8 and then plus the second priority.

In one embodiment, the multiple first-type thresholds comprised in any of the multiple first-type threshold lists are respectively multiple RSRP.

In one embodiment, the multiple first-type thresholds comprised in any of the multiple first-type threshold lists are respectively multiple SL RSRP.

In one embodiment, the multiple first-type thresholds comprised in any of the multiple first-type threshold lists are respectively multiple L1 RSRP.

In one embodiment, the multiple first-type thresholds comprised in any of the multiple first-type threshold lists are respectively multiple L3 RSRP.

In one embodiment, the multiple first-type thresholds comprised in any of the multiple first-type threshold lists are respectively multiple SINRs.

In one embodiment, the multiple first-type thresholds comprised in any of the multiple first-type threshold lists are respectively multiple L1 SINRs.

In one embodiment, the X1 first-type thresholds respectively belong to X1 second-type threshold lists, and any of the X1 second-type threshold lists comprises multiple first-type thresholds; the X1 second-type threshold lists respectively correspond to the X1 resource sub-pools, and a second threshold list is one of the X1 second-type threshold lists corresponding to the target resource sub-pool; the second threshold list comprises the target threshold.

In one embodiment, the X1 first-type thresholds respectively belong to X1 second-type threshold lists, and any of the X1 second-type threshold lists comprises multiple first-type thresholds; the X1 second-type threshold lists respectively belong to the X1 resource sub-pools, and a second threshold list is one of the X1 second-type threshold lists belonging to the target resource sub-pool; the second threshold list comprises the target threshold.

In one embodiment, X1 second-type thresholds respectively comprise the X1 first-type thresholds, and any of the X1 second-type threshold lists comprises multiple first-type thresholds; the X1 second-type threshold lists respectively correspond to the X1 resource sub-pools, and a second threshold list is one of the X1 second-type threshold lists corresponding to the target resource sub-pool; the second threshold list comprises the target threshold.

In one embodiment, X1 second-type thresholds respectively comprise the X1 first-type thresholds, and any of the X1 second-type threshold lists comprises multiple first-type thresholds; the X1 resource sub-pools are respectively configured with the X1 second-type threshold lists, and a second threshold list is one of the X1 second-type threshold lists configured to the target resource sub-pool; the second threshold list comprises the target threshold.

In one embodiment, the target resource sub-pool is used to determine the second threshold list out of the X1 second-type threshold lists, and the first priority and the second priority are used together to determine the target threshold out of the multiple first-type thresholds comprised in the second threshold list.

In one embodiment, the target resource sub-pool is used to determine the second threshold list out of the X1 second-type threshold lists, and a combination of the first priority and the second priority is used to determine the target threshold out of the multiple first-type thresholds comprised in the second threshold list.

In one embodiment, an index of the target resource sub-pool in the X1 resource sub-pools is equal to an index of the second threshold list in the X1 second-type threshold lists, and a linearly added sum of the first priority and the second priority is equal to an index of the target threshold in the multiple first-type thresholds comprised in the second threshold list.

In one embodiment, an index of the target threshold in the multiple first-type thresholds comprised in the second threshold list is equal to the first priority minus 1 then multiplied by 8 and then plus the second priority.

In one embodiment, the multiple first-type thresholds comprised in any of the X1 second-type threshold lists are respectively multiple RSRP.

In one embodiment, the multiple first-type thresholds comprised in any of the X1 second-type threshold lists are respectively multiple SL RSRP.

In one embodiment, the multiple first-type thresholds comprised in any of the X1 second-type threshold lists are respectively multiple L1 RSRP.

In one embodiment, the multiple first-type thresholds comprised in any of the X1 second-type threshold lists are respectively multiple L3 RSRP.

In one embodiment, the multiple first-type thresholds comprised in any of the X1 second-type threshold lists are respectively multiple SINRs.

In one embodiment, the multiple first-type thresholds comprised in any of the X1 second-type threshold lists are respectively multiple L1 SINRs.

In one embodiment, a first reference threshold is one of multiple reference thresholds.

In one embodiment, the X1 first-type thresholds are respectively sums of the first reference threshold and X1 first-type offset values.

In one embodiment, the X1 first-type thresholds are respectively products of the first reference threshold and X1 first-type offset values.

In one embodiment, a first offset is one of the X1 first-type offset values.

In one embodiment, the target threshold is equal to a sum of the first reference threshold and the first offset value.

In one embodiment, the target threshold is equal to a difference value between the first reference threshold and the first offset value.

In one embodiment, the target threshold is equal to a product of the first reference threshold and the first offset value.

In one embodiment, the target threshold is equal to a quotient of the first reference threshold and the first offset value.

In one embodiment, the X1 first-type threshold comprises the first reference threshold.

In one embodiment, the first reference threshold is one of the X1 first-type thresholds.

In one embodiment, one of the X1 first-type offset values is 0.

In one embodiment, a sum of the first reference threshold and a target offset value is one of the X1 first-type thresholds, a first target offset value is one of the X1 first-type offset value, and the first target offset value is 0.

In one embodiment, the multiple reference thresholds are respectively multiple RSRP.

In one embodiment, the multiple reference thresholds are respectively multiple SL RSRP.

In one embodiment, the multiple reference thresholds are respectively multiple SINRs.

In one embodiment, the X1 first-type offsets are respectively X1 RSRP.

In one embodiment, the X1 first-type offsets are respectively X1 SINRs.

In one embodiment, the first priority and the second priority are used together to determine the first reference threshold; the target resource sub-pool is used to determine the first offset value.

In one embodiment, the first priority and the second priority are used together to determine the first reference threshold out of the multiple reference thresholds; the target resource sub-pool is used to determine the first offset value out of the X1 first-type offset values.

In one embodiment, a combination of the first priority and the second priority is used to determine the first reference threshold out of the multiple reference thresholds; an index of the target resource sub-pool in the X1 resource sub-pools is equal to an index of the first offset value in the X1 first-type offset values.

In one embodiment, a combination of the first priority and the second priority is used to determine the first reference threshold out of the multiple reference thresholds; an index of the target resource sub-pool in the X1 resource sub-pools is equal to an index of the first offset value in the X1 first-type offset values; the target threshold is equal to a sum of the first reference threshold and the first offset value.

In one embodiment, a combination of the first priority and the second priority is used to determine the first reference threshold out of the multiple reference thresholds; an index of the target resource sub-pool in the X1 resource sub-pools is equal to an index of the first offset value in the X1 first-type offset values; the target threshold is equal to a product of the first reference threshold and the first offset value.

In one embodiment, the target resource sub-pool comprises the first time-frequency resource block.

In one embodiment, the first time-frequency resource block is one of the multiple time-frequency resource blocks comprised in the target resource sub-pool.

In one embodiment, the first time-frequency resource block comprises a PSCCH.

In one embodiment, the first time-frequency resource block comprises a PSSCH.

In one embodiment, the first time-frequency resource block comprises a PSCCH and a PSSCH.

In one embodiment, the first time-frequency resource block comprises a PSFCH.

In one embodiment, the target resource sub-pool comprises the second time-frequency resource block.

In one embodiment, the second time-frequency resource block is one of the multiple time-frequency resource blocks comprised in the target resource sub-pool.

In one embodiment, the target resource sub-pool comprises the first time-frequency resource block and the second time-frequency resource block.

In one embodiment, the first time-frequency resource block and the second time-frequency resource block are respectively two time-frequency resource blocks in the multiple time-frequency resource blocks comprised in the target resource sub-pool.

In one embodiment, the first time-frequency resource block and the second time-frequency resource block are orthogonal in time domain.

In one embodiment, time-domain resources occupied by the first time-frequency resource block are different from time-domain resources occupied by the second time-frequency resource block.

In one embodiment, the first time-frequency resource block and the second time-frequency resource block respectively belong to two different time-domain resource blocks in the multiple time-domain resource blocks comprised in the first resource pool.

In one embodiment, the first time-frequency resource block and the second time-frequency resource block respectively belong to two different slots.

In one embodiment, the first time-frequency resource block and the second time-frequency resource block are overlapping in frequency domain.

In one embodiment, frequency-domain resources occupied by the first time-frequency resource block are overlapping with frequency-domain resources occupied by the second time-frequency resource block.

In one embodiment, frequency-domain resources occupied by the first time-frequency resource block comprise frequency-domain resources occupied by the second time-frequency resource block.

In one embodiment, frequency-domain resources occupied by the second time-frequency resource block comprise frequency-domain resources occupied by the first time-frequency resource block.

In one embodiment, frequency-domain resources occupied by the first time-frequency resource block are the same as frequency-domain resources occupied by the second time-frequency resource block.

In one embodiment, at least one PRB in the positive integer number of PRB(s) occupied by the first time-frequency resource block in frequency domain is the same as at least one PRB in the positive integer number of PRB(s) occupied by the second time-frequency resource block in frequency domain.

In one embodiment, at least one PRB in the positive integer number of PRB(s) occupied by the first time-frequency resource block in frequency domain is different from at least one PRB in the positive integer number of PRB(s) occupied by the second time-frequency resource block in frequency domain.

In one embodiment, at least one PRB in the positive integer number of PRB(s) occupied by the first time-frequency resource block in frequency domain is the same as at least one PRB in the positive integer number of PRB(s) occupied by the second time-frequency resource block in frequency domain, and at least one PRB in the positive integer number of PRB(s) occupied by the first time-frequency resource block in frequency domain is different from at least one PRB in the positive integer number of PRB(s) occupied by the second time-frequency resource block in frequency domain.

In one embodiment, the first time-frequency resource block and the second time-frequency resource block are orthogonal in time domain, and the first time-frequency resource block and the second time-frequency resource block are overlapping in frequency domain.

In one embodiment, the first time-frequency resource block is earlier than the second time-frequency resource block in time domain.

In one embodiment, a time-domain resource block in the first resource pool occupied by the second time-frequency resource block and a time-domain resource block in the first resource pool occupied by the first time-frequency resource block are spaced by a first time offset, and the first time offset is a positive integral multiple of a first periodic value.

In one embodiment, the first time offset comprises a positive integer number of time-domain resource block(s) in the first resource pool.

In one embodiment, the first time offset comprises a positive integer number of slot(s) in the first resource pool.

In one embodiment, the first time offset comprises a positive integer number of multicarrier symbol(s) in the first resource pool.

In one embodiment, the first periodic value comprises a positive integer number of time-domain resource block(s) in the first resource pool.

In one embodiment, the first periodic value comprises a positive integer number of slot(s) in the first resource pool.

In one embodiment, the first periodic value comprises a positive integer number of multicarrier symbol(s) in the first resource pool.

In one embodiment, the first periodic value is configured by a higher layer signaling.

In one embodiment, the first periodic value is pre-configured.

Embodiment 8

Figure 8:
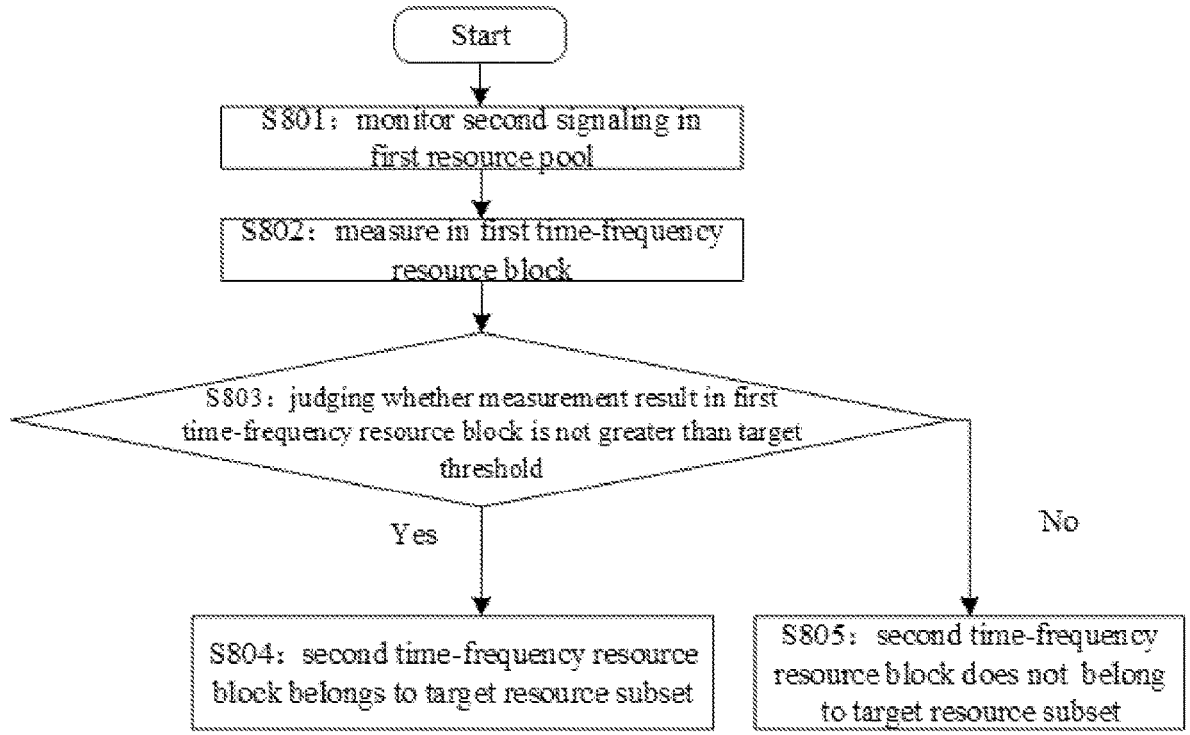
FIG. 8 illustrates a flowchart of determining whether a second time-frequency resource block belonging to a target resource subset according to one embodiment of the present application.

Embodiment 8 illustrates a flowchart for determining whether a second time-frequency resource block belongs to a target resource subset according to one embodiment of the present application, as shown in FIG. 8.

In embodiment 8, in step S801, a second signaling is monitored in a first resource pool, and the second signaling indicates a second priority and a first time-frequency resource block; in step S802, a measurement is performed in a first time-frequency resource block; in step S803, it is judged whether a measurement result in a first time-frequency resource block is not greater than a target threshold; when a measurement result in a first time-frequency resource block is less than or equal to a target threshold, execute step S804, and a second time-frequency resource block belongs to a target resource subset; when a measurement result in a first time-frequency resource block is greater than a target threshold, execute step S805, and a second time-frequency resource block does not belong to a target resource subset.

In one embodiment, the second signaling is received on the first time-frequency resource block.

In one embodiment, a first reference signal is transmitted on the first time-frequency resource block.

In one embodiment, the first reference signal occupies partial REs in the multiple REs comprised in the first time-frequency resource block.

In one embodiment, time-frequency resources occupied by the first reference signal are the partial REs in the multiple REs comprised in the first time-frequency resource block.

In one embodiment, the second signaling indicates the first reference signal, and the first reference signal is transmitted in the first time-frequency resource block.

In one embodiment, the first reference signal is transmitted in the first time-frequency resource block, and the second signaling indicates the time-frequency resources occupied by the first reference signal.

In one embodiment, the first reference signal is transmitted in the first time-frequency resource block, and the second signaling indicates the partial REs in the multiple REs comprised in the first time-frequency resource block occupied by the first reference signal.

In one embodiment, the first reference signal comprises an SL RS.

In one embodiment, the first reference signal comprises a SL DMRS.

In one embodiment, the first reference signal comprises a PSCCH DMRS.

In one embodiment, the first reference signal comprises a PSSCH DMRS.

In one embodiment, the first reference signal comprises a first sequence.

In one embodiment, a first sequence is used to generate the first reference signal.

In one embodiment, the first sequence is a Pseudo-Random Sequence.

In one embodiment, the first sequence is a Low-Peak to Average Power Ratio (Low-PAPR) sequence.

In one embodiment, the first sequence obtains the first reference signal sequentially through sequence generation, resource element mapping and wideband symbol generation.

In one embodiment, the first reference signal is mapped onto the multiple REs comprised in the first time-frequency resource block.

In one embodiment, the first reference signal is mapped onto partial REs in the multiple REs comprised in the first time-frequency resource block.

In one embodiment, measuring in the first time-frequency resource block refers to measuring in the first reference signal on the first time-frequency resource block.

In one embodiment, measuring in the first time-frequency resource block refers to executing a coherent detection-based reception of the first reference signal on the first time-frequency resource block, that is, the first node executes a coherent reception of a signal on time-frequency resources occupied by the first reference signal with the first sequence, and measures that signal energy obtained after the coherent reception is the measurement result in the first time-frequency resource block.

In one embodiment, measuring in the first time-frequency resource block refers to executing a coherent detection-based reception of the first reference signal on the first time-frequency resource block, that is, the first node executes a coherent reception of a signal on time-frequency resources occupied by the first reference signal with the first sequence, and linearly averages signal power received on time-frequency resources occupied by the first reference signal to obtain that received power is the measurement result in the first time-frequency resource block.

In one embodiment, measuring in the first time-frequency resource block refers to executing a coherent detection-based reception of the first reference signal on the first time-frequency resource block, that is, the first node executes a coherent reception of a signal on time-frequency resources occupied by the first reference signal with the first sequence, and averages received signal energy in time domain and frequency domain to obtain that received power is the measurement result in the first time-frequency resource block.

In one embodiment, measuring in the first time-frequency resource block refers to executing an energy detection-based reception of the first reference signal on the first time-frequency resource block, that is, the first node respectively senses energy of a radio signal on time-frequency resources occupied by the first reference signal, and averages it on time-frequency resources occupied by the first reference signal, so as to obtain that received power is the measurement result in the first time-frequency resource block.

In one embodiment, measuring in the first time-frequency resource block refers to executing an energy detection-based reception on the first time-frequency resource block, that is, the first node receives power of a radio signal on the first time-frequency resource block, and linearly averages the received signal power to obtain that a signal strength indication is the measurement result in the first time-frequency resource block.

In one embodiment, measuring in the first time-frequency resource block refers to executing an energy detection-based reception on the first time-frequency resource block, that is, the first node senses energy of a radio signal on the first time-frequency resource block and averages it in time to obtain that a signal strength indication is the measurement result in the first time-frequency resource block.

In one embodiment, measuring in the first time-frequency resource block refers to a blind detection-based reception on the first time-frequency resource block, that is, the first node receives a signal on the first time-frequency resource block and executes a decoding operation, and determines whether the decoding is correct according to a CRC bit to obtain that channel quality of the first reference signal on time-frequency resources occupied by the first reference signal is the measurement result in the first time-frequency resource block.

In one embodiment, the measurement result in the first time-frequency resource block comprises RSRP.

In one embodiment, the measurement result in the first time-frequency resource block comprises SL RSRP.

In one embodiment, the measurement result in the first time-frequency resource block comprises L1 RSRP.

In one embodiment, the measurement result in the first time-frequency resource block comprises L3 RSRP.

In one embodiment, the measurement result in the first time-frequency resource block comprises an SINR.

In one embodiment, the measurement result in the first time-frequency resource block comprises an L1 SINR.

In one embodiment, the measurement result in the first time-frequency resource block comprises a Received Signal Strength Indication (RSSI).

In one embodiment, the measurement result in the first time-frequency resource block comprises an SL RSSI.

In one embodiment, the measurement result in the first time-frequency resource block comprises Reference Signal Receiving Quality (RSRQ).

In one embodiment, a unit for the measurement result in the first time-frequency resource block is dBm.

In one embodiment, a unit for the measurement result in the first time-frequency resource block is dB.

In one embodiment, a unit for the measurement result in the first time-frequency resource block is mW.

In one embodiment, a unit for the measurement result in the first time-frequency resource block is W.

In one embodiment, the target resource subset comprises the second time-frequency resource block.

In one embodiment, the second time-frequency resource block belongs to the target resource subset.

In one embodiment, the second time-frequency resource block is one of the at least one candidate time-frequency resource block comprised in the target resource subset.

In one embodiment, the target resource subset does not comprise the second time-frequency resource block.

In one embodiment, the second time-frequency resource block does not belong to the target resource subset.

In one embodiment, the second time-frequency resource block is not one of the at least one candidate time-frequency resource block comprised in the target resource subset.

In one embodiment, the second time-frequency resource block is different from any of the at least one candidate time-frequency resource block comprised in the target resource subset.

In one embodiment, a size relationship of the measurement result in the first time-frequency resource block and the target threshold is used to determine whether the second time-frequency resource block belongs to the target resource subset.

In one embodiment, a size relationship of the measurement result in the first time-frequency resource block and the target threshold is used to determine whether the target resource subset comprises the second time-frequency resource block.

In one embodiment, a size relationship of the measurement result in the first time-frequency resource block and the target threshold is used to determine whether the second time-frequency resource block is one of the at least one candidate time-frequency resource block comprised in the target resource subset.

In one embodiment, the measurement result in the first time-frequency resource block is not greater than the target threshold, and the second time-frequency resource block belongs to the target resource subset.

In one embodiment, the measurement result in the first time-frequency resource block is less than the target threshold, and the second time-frequency resource block belongs to the target resource subset.

In one embodiment, the measurement result in the first time-frequency resource block is equal to the target threshold, and the second time-frequency resource block belongs to the target resource subset.

In one embodiment, the measurement result in the first time-frequency resource block is greater than the target threshold, and the second time-frequency resource block does not belong to a target resource subset.

In one embodiment, the measurement result in the first time-frequency resource block is not greater than the target threshold, and the second time-frequency resource block is one of the at least one candidate time-frequency resource block comprised in the target resource subset.

In one embodiment, the measurement result in the first time-frequency resource block is less than the target threshold, and the second time-frequency resource block is one of the at least one candidate time-frequency resource block comprised in the target resource subset.

In one embodiment, the measurement result in the first time-frequency resource block is equal to the target threshold, and the second time-frequency resource block is one of the at least one candidate time-frequency resource block comprised in the target resource subset.

In one embodiment, the measurement result in the first time-frequency resource block is greater than the target threshold, and the second time-frequency resource block is different from any of the at least one candidate time-frequency resource block comprised in the target resource subset.

In one embodiment, when the measurement result in the first time-frequency resource block is not greater than the target threshold, the second time-frequency resource block belongs to the target resource subset; when the measurement result in the first time-frequency resource block is greater than the target threshold, and the second time-frequency resource block does not belong to a target resource subset.

In one embodiment, when the measurement result in the first time-frequency resource block is not greater than the target threshold, the second time-frequency resource block is one of the at least one candidate time-frequency resource block comprised in the target resource subset; when the measurement result in the first time-frequency resource block is greater than the target threshold, the second time-frequency resource block is different from any of the at least one candidate time-frequency resource block comprised in the target resource subset.

In one embodiment, when the measurement result in the first time-frequency resource block is less than the target threshold, the second time-frequency resource block belongs to the target resource subset; when the measurement result in the first time-frequency resource block is equal to the target threshold, the second time-frequency resource block belongs to the target resource subset; when the measurement result for the first time-frequency resource block is greater than the target threshold, the second time-frequency resource block does not belong to a target resource subset.

In one embodiment, when the measurement result in the first time-frequency resource block is less than the target threshold, the second time-frequency resource block is one of the at least one candidate time-frequency resource block comprised in the target resource subset; when the measurement result in the first time-frequency resource block is equal to the target threshold, the second time-frequency resource block is one of the at least one candidate time-frequency resource block comprised in the target resource subset; when the measurement result in the first time-frequency resource block is greater than the target threshold, the second time-frequency resource block is different from any of the at least one candidate time-frequency resource block comprised in the target resource subset.

In one embodiment, the X1 resource sub-pools comprise a first resource sub-pool and a second resource sub-pool; a first threshold and a second threshold are respectively two of the X1 first-type thresholds; the first threshold is one of the X1 first-type thresholds corresponding to the first resource sub-pool, and the second threshold is one of the X1 first-type thresholds corresponding to the second resource sub-pool; the first threshold is used to determine a first candidate resource subset out of the first resource sub-pool, and the second threshold is used to determine a second candidate resource subset out of the second resource sub-pool; both the first candidate resource subset and the second candidate resource subset belong to the candidate resource set.

In one embodiment, the first threshold is not equal to the second threshold.

In one embodiment, the first threshold is lower than the second threshold.

In one embodiment, the first threshold is higher than the second threshold.

In one embodiment, a size relationship of the first threshold and the second threshold is used to determine that the target time-frequency resource block is preferentially selected from one of the first candidate resource subset or the second candidate resource subset.

In one embodiment, the first threshold is lower than the second threshold, and the target time-frequency resource block is preferentially selected from a former of the first candidate resource subset and the second candidate resource subset.

In one embodiment, the first threshold is higher than the second threshold, and the target time-frequency resource block is preferentially selected from a latter of the first candidate resource subset and the second candidate resource subset.

In one embodiment, the first threshold is higher than the second threshold, and the target time-frequency resource block is preferentially selected from a former of the first candidate resource subset and the second candidate resource subset.

In one embodiment, the first threshold is lower than the second threshold, and the target time-frequency resource block is preferentially selected from a latter of the first candidate resource subset and the second candidate resource subset.

In one embodiment, the X1 resource sub-pools comprise a first resource sub-pool and a second resource sub-pool; a first threshold and a second threshold are respectively two of the X1 first-type thresholds; the first threshold is one of the X1 first-type thresholds corresponding to the first resource sub-pool, and the second threshold is one of the X1 first-type thresholds corresponding to the second resource sub-pool; the first threshold is used to determine a first candidate resource subset out of the first resource sub-pool, and the second threshold is used to determine a second candidate resource subset out of the second resource sub-pool; both the first candidate resource subset and the second candidate resource subset belong to the candidate resource set; a size relationship of the first threshold and the second threshold is used to determine the target time-frequency resource block is preferentially selected from the first candidate resource subset and the second candidate resource subset.

In one embodiment, the X1 resource sub-pools comprise a first resource sub-pool and a second resource sub-pool; a first threshold and a second threshold are respectively two of the X1 first-type thresholds; the first threshold is one of the X1 first-type thresholds corresponding to the first resource sub-pool, and the second threshold is one of the X1 first-type thresholds corresponding to the second resource sub-pool; the first threshold is used to determine a first candidate resource subset out of the first resource sub-pool, and the second threshold is used to determine a second candidate resource subset out of the second resource sub-pool; both the first candidate resource subset and the second candidate resource subset belong to the candidate resource set; the first threshold is higher than the second threshold, and the target time-frequency resource block is preferentially selected from a former of the first candidate resource subset and the second candidate resource subset.

In one embodiment, the X1 resource sub-pools comprise a first resource sub-pool and a second resource sub-pool; a first threshold and a second threshold are respectively two of the X1 first-type thresholds; the first threshold is one of the X1 first-type thresholds corresponding to the first resource sub-pool, and the second threshold is one of the X1 first-type thresholds corresponding to the second resource sub-pool; the first threshold is used to determine a first candidate resource subset out of the first resource sub-pool, and the second threshold is used to determine a second candidate resource subset out of the second resource sub-pool; both the first candidate resource subset and the second candidate resource subset belong to the candidate resource set; when the first threshold is higher than the second threshold, and the target time-frequency resource block is preferentially selected from a former of the first candidate resource subset and the second candidate resource subset; when the first threshold is lower than the second threshold, the target time-frequency resource block is preferentially selected from a latter of the first candidate resource subset and the second candidate resource subset.

In one embodiment, the X1 resource sub-pools comprise a first resource sub-pool and a second resource sub-pool; a first threshold and a second threshold are respectively two of the X1 first-type thresholds; the first threshold is lower than the second threshold; the first threshold is one of the X1 first-type thresholds corresponding to the first resource sub-pool, and the second threshold is one of the X1 first-type thresholds corresponding to the second resource sub-pool; the first threshold is used to determine a first candidate resource subset out of the first resource sub-pool, the first candidate resource subset comprises Q1 candidate time-frequency resource blocks, and the Q1 candidate time-frequency resource blocks comprised in the first candidate resource subset belong to the candidate resource set, Q1 being a positive integer greater than 1.

In one embodiment, the X1 resource sub-pools comprise a first resource sub-pool and a second resource sub-pool; a first threshold and a second threshold are respectively two of the X1 first-type thresholds; the first threshold is higher than the second threshold; the first threshold is one of the X1 first-type thresholds corresponding to the first resource sub-pool, and the second threshold is one of the X1 first-type thresholds corresponding to the second resource sub-pool; the first threshold is used to determine a first candidate resource subset out of the first resource sub-pool, the first candidate resource subset comprises Q1 candidate time-frequency resource blocks, and the Q1 candidate time-frequency resource blocks comprised in the first candidate resource subset belong to the candidate resource set, Q1 being a positive integer greater than 1.

In one embodiment, a size relationship of Q1 and a first value is used to determine whether the candidate resource set is orthogonal to the second resource sub-pool.

In one embodiment, a size relationship of Q1 and a first value is used to determine whether the candidate resource set is overlapping with the second resource sub-pool.

In one embodiment, a size relationship of Q1 and a first value is used to determine whether the candidate resource set comprises a second candidate resource subset, the second candidate resource subset comprises multiple candidate time-frequency resource blocks, and the multiple candidate time-frequency resource blocks comprised in the second candidate resource subset belong to the second resource sub-pool.

In one embodiment, a size relationship of Q1 and a first value is used to determine whether the candidate resource set comprises a second candidate resource subset, the second candidate resource subset belongs to the second resource sub-pool, and the second threshold is used to determine the second candidate resource subset out of the second resource sub-pool.

In one embodiment, Q1 is less than the first value, and the candidate resource set is overlapping with the second resource sub-pool.

In one embodiment, Q1 is not less than the first value, and the candidate resource set is orthogonal to the second resource sub-pool.

In one embodiment, Q1 is greater than the first value, and the candidate resource set is orthogonal to the second resource sub-pool.

In one embodiment, Q1 is equal to the first value, and the candidate resource set is orthogonal to the second resource sub-pool.

In one embodiment, Q1 is less than the first value, and the candidate resource set comprises at least one time-frequency resource block in the second resource sub-pool.

In one embodiment, Q1 is less than the first value, and at least one candidate time-frequency resource block in the candidate resource set is a time-frequency resource block in the second resource sub-pool.

In one embodiment, Q1 is not less than the first value, and any candidate time-frequency resource block in the candidate resource set does not belong to the second resource sub-pool.

In one embodiment, Q1 is not less than the first value, and any candidate time-frequency resource block in the candidate resource set is not a time-frequency resource block in the second resource sub-pool.

In one embodiment, Q1 is not less than the first value, and any time-frequency resource block in the second resource sub-pool is different from any of the multiple candidate time-frequency resource blocks comprised in the candidate resource set.

In one embodiment, Q1 is not less than the first value, and any candidate time-frequency resource block in the candidate resource set is different from any time-frequency resource block in the multiple time-frequency resource blocks comprised in the second resource sub-pool.

In one embodiment, Q1 is greater than the first value, and any candidate time-frequency resource block in the candidate resource set does not belong to the second resource sub-pool.

In one embodiment, Q1 is greater than the first value, and any candidate time-frequency resource block in the candidate resource set is not a time-frequency resource block in the second resource sub-pool.

In one embodiment, Q1 is greater than the first value, and any candidate time-frequency resource block in the candidate resource set is different from any time-frequency resource block in the second resource sub-pool.

In one embodiment, Q1 is equal to the first value, and any candidate time-frequency resource block in the candidate resource set does not belong to the second resource sub-pool.

In one embodiment, Q1 is equal to the first value, and any candidate time-frequency resource block in the candidate resource set is not a time-frequency resource block in the second resource sub-pool.

In one embodiment, Q1 is equal to the first value, and any candidate time-frequency resource block in the candidate resource set is different from any time-frequency resource block in the second resource sub-pool.

In one embodiment, Q1 is less than the first value, and the candidate resource set comprises the second candidate resource subset.

In one embodiment, Q1 is not less than the first value, and the candidate resource set does not comprise the second candidate resource subset.

In one embodiment, Q1 is greater than the first value, and the candidate resource set does not comprise the second candidate resource subset.

In one embodiment, Q1 is equal to the first value, and the candidate resource set does not comprise the second candidate resource subset.

In one embodiment, Q1 is not less than the first value, and any candidate time-frequency resource block comprised in the second candidate resource subset is different from any of the multiple candidate time-frequency resource blocks comprised in the candidate resource set.

In one embodiment, the X1 resource sub-pools comprise a first resource sub-pool and a second resource sub-pool; a first threshold and a second threshold are respectively two of the X1 first-type thresholds; the first threshold is higher than the second threshold; the first threshold is one of the X1 first-type thresholds corresponding to the first resource sub-pool, and the second threshold is one of the X1 first-type thresholds corresponding to the second resource sub-pool; the first threshold is used to determine a first candidate resource subset out of the first resource sub-pool, the first candidate resource subset comprises Q1 candidate time-frequency resource blocks, and the Q1 candidate time-frequency resource blocks comprised in the first candidate resource subset belong to the candidate resource set, Q1 being a positive integer greater than 1; a size relationship of Q1 and a first value is used to determine whether the candidate resource set is orthogonal to the second resource sub-pool.

In one embodiment, the X1 resource sub-pools comprise a first resource sub-pool and a second resource sub-pool; a first threshold and a second threshold are respectively two of the X1 first-type thresholds; the first threshold is higher than the second threshold; the first threshold is one of the X1 first-type thresholds corresponding to the first resource sub-pool, and the second threshold is one of the X1 first-type thresholds corresponding to the second resource sub-pool; the first threshold is used to determine a first candidate resource subset out of the first resource sub-pool, the first candidate resource subset comprises Q1 candidate time-frequency resource blocks, and the Q1 candidate time-frequency resource blocks comprised in the first candidate resource subset belong to the candidate resource set, Q1 being a positive integer greater than 1; a size relationship of Q1 and a first value is used to determine whether the candidate resource set is overlapping with the second resource sub-pool.

In one embodiment, the X1 resource sub-pools comprise a first resource sub-pool and a second resource sub-pool; a first threshold and a second threshold are respectively two of the X1 first-type thresholds; the first threshold is one of the X1 first-type thresholds corresponding to the first resource sub-pool, and the second threshold is one of the X1 first-type thresholds corresponding to the second resource sub-pool; the first threshold is higher than the second threshold; the first threshold is used to determine a first candidate resource subset out of the first resource sub-pool, the first candidate resource subset belongs to the candidate resource set, and the first candidate resource subset comprises Q1 candidate time-frequency resource blocks in the candidate resource set, Q1 being a positive integer greater than 1; a size relationship of Q1 and a first value is used to determine whether the candidate resource set comprises a second candidate resource subset, and the second threshold is used to determine the second candidate resource subset out of the second resource sub-pool.

In one embodiment, the first value is configured by a higher-layer signaling.

In one embodiment, the first value is pre-configured.

Embodiment 9

Figure 9:
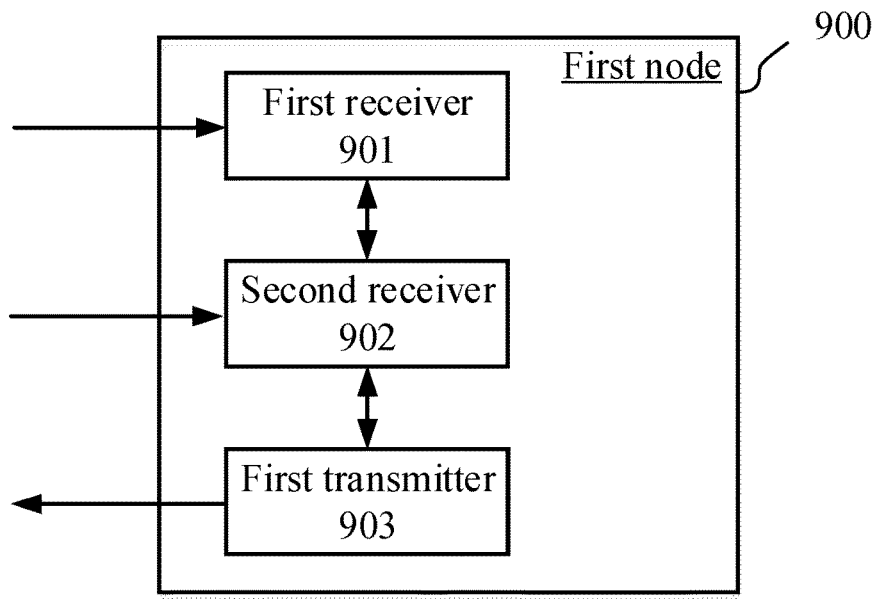
FIG. 9 illustrates a structure block diagram of a processor in a first node according to one embodiment of the present application.

Embodiment 9 illustrates a structure block diagram of a processor in first node according to one embodiment of the present application, as shown in FIG. 9. In embodiment 9, a processor 900 of a first node mainly consists of a first receiver 901, a second receiver 902 and a first transmitter 903.

In one embodiment, the first receiver 901 comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the second receiver 902 comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the first transmitter 903 comprises at least one of the antenna 452, the transmitter/receiver 454, the multi-antenna transmitting processor 457, the transmitting processor 468, the controller/processor 459, the memory 460, or the data source 467 in FIG. 4 of the present application.

In embodiment 9, the first receiver 901 receives a first signaling, the first signaling indicates a first resource pool and X1 resource sub-pools, any of the X1 resource sub-pools belongs to the first resource pool, X1 being a positive integer greater than 1; the second receiver 902 determines a candidate resource set out of the first resource pool, the candidate resource set comprises at least one candidate time-frequency resource block; and the first transmitter 903 transmits a target signal on a target time-frequency resource block, the target time-frequency resource block is a candidate time-frequency resource block comprised in the candidate resource set; the candidate resource set comprises at least one candidate resource subset, a target resource subset is one of the at least one candidate resource subset comprised in the candidate resource set; a candidate time-frequency resource block in the target resource subset belongs to a target resource sub-pool, and the target resource sub-pool is one of the X1 resource sub-pools; the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and the target threshold is used to determine the target resource subset out of the target resource sub-pool.

In one embodiment, the second receiver 902 monitors a second signaling in the first resource pool, and the second signaling indicates a second priority and a first time-frequency resource block; the second receiver 902 measures in the first time-frequency resource block, the first time-frequency resource block belongs to the target resource sub-pool; the first priority, the second priority and the target resource sub-pool are used together to determine the target threshold out of the X1 first-type thresholds; the first time-frequency resource block is associated with a second time-frequency resource block, the second time-frequency resource block belongs to the target resource sub-pool, and the first time-frequency resource block and the second time-frequency resource block are orthogonal in time domain; a size relationship of a measurement result in the first time-frequency resource block and the target threshold is used to determine whether the second time-frequency resource block belongs to the target resource subset.

In one embodiment, the X1 first-type thresholds belong to one of multiple first-type threshold lists; the first priority and the second priority are used together to determine a first-type threshold list to which the X1 first-type thresholds belong out of the multiple first-type threshold lists; the target resource sub-pool is used to determine the target threshold out of the X1 first-type thresholds.

In one embodiment, the X1 first-type thresholds respectively belong to X1 second-type threshold lists, and the target threshold belongs to one of the X1 second-type threshold lists; the target resource sub-pool is used to determine a second-type threshold list to which the target threshold belongs out of the X1 second-type threshold lists; the first priority and the second priority are used together to determine the target threshold out of a second-type threshold list to which the target threshold belongs.

In one embodiment, a first reference threshold is one of multiple reference thresholds, and the first reference threshold is one of the X1 first-type thresholds; the first priority and the second priority are used together to determine the first reference threshold out of the multiple reference thresholds, the target resource sub-pool is used to determine a first offset value, and the first reference threshold and the first offset value are used together to determine the target threshold.

In one embodiment, the X1 resource sub-pools comprise a first resource sub-pool and a second resource sub-pool; a first threshold is a first-type threshold corresponding to the first resource sub-pool among the X1 first-type thresholds, and a second threshold is a first-type threshold corresponding to the second resource sub-pool among the X1 first-type thresholds; the first threshold is used to determine a first candidate resource subset out of the first resource sub-pool, and the second threshold is used to determine a second candidate resource subset out of the second resource sub-pool; both the first candidate resource subset and the second candidate resource subset belong to the candidate resource set; the first threshold is higher than the second threshold; the target time-frequency resource block is preferentially selected from a former of the first candidate resource subset and the second candidate resource subset.

In one embodiment, the X1 resource sub-pools comprise a first resource sub-pool and a second resource sub-pool; a first threshold is a first-type threshold corresponding to the first resource sub-pool among the X1 first-type thresholds, and a second threshold is a first-type threshold corresponding to the second resource sub-pool among the X1 first-type thresholds; the first threshold is higher than the second threshold; the first threshold is used to determine a first candidate resource subset out of the first resource sub-pool, the first candidate resource subset belongs to the candidate resource set, and the first candidate resource subset comprises Q1 candidate time-frequency resource blocks, Q1 being a positive integer greater than 1; a size relationship of Q1 and a first value is used to determine whether the candidate resource set is orthogonal to the second resource sub-pool.

In one embodiment, the first node 900 is a UE.

In one embodiment, the first node 900 is a relay node.

In one embodiment, the first node 900 is a base station.

Embodiment 10

Figure 10:
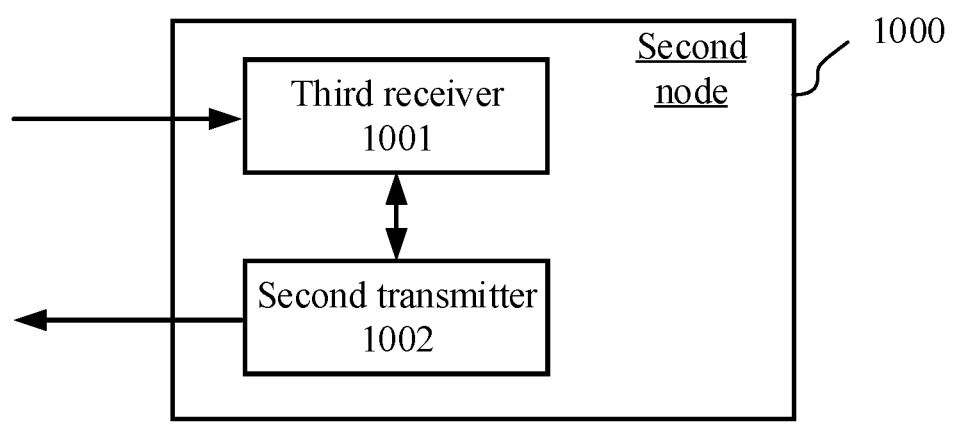
FIG. 10 illustrates a structure block diagram of a processor in a second node according to one embodiment of the present application.

Embodiment 10 illustrates a structure block diagram of a processor in a second node, as shown in FIG. 10. In embodiment 10, a processor 1000 of a second node mainly consists of a third receiver 1001 and a second transmitter 1002.

In one embodiment, the third receiver 1001 comprises at least one of the antenna 420, the transmitter/receiver 418, the multi-antenna receiving processor 472, the receiving processor 470, the controller/processor 475 or the memory 476 in FIG. 4 of the present application.

In one embodiment, the second transmitter 1002 comprises at least one of the antenna 420, the transmitter/receiver 418, the multi-antenna transmitting processor 471, the transmitting processor 416, the controller/processor 475 or the memory 476 in FIG. 4 of the present application.

In embodiment 10, the third receiver 1001 receives a first signaling, the first signaling indicates a first resource pool and X1 resource sub-pools, any of the X1 resource sub-pools belongs to the first resource pool, X1 being a positive integer greater than 1; the second transmitter 1002 transmits a second signaling in a first resource pool, the second signaling indicates a second priority and a first time-frequency resource block, the first time-frequency resource block belongs to a target resource sub-pool, and the target resource sub-pool is one of the X1 resource sub-pools; and the third receiver 1001 receives a target signal on a target time-frequency resource block, the target time-frequency resource block belongs to the target resource sub-pool; the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and a size relationship of a measurement result in the first time-frequency resource block and the target threshold is used by a receiver of the second signaling to determine the target time-frequency resource block out of the target resource sub-pool; the first priority, the second priority and the target resource sub-pool are used together to determine the target threshold out of the X1 first-type thresholds.

In one embodiment, the X1 first-type thresholds belong to one of multiple first-type threshold lists; the first priority and the second priority are used together to determine a first-type threshold list to which the X1 first-type thresholds belong out of the multiple first-type threshold lists; the target resource sub-pool is used to determine the target threshold out of the X1 first-type thresholds.

In one embodiment, the X1 first-type thresholds respectively belong to X1 second-type threshold lists, and the target threshold belongs to one of the X1 second-type threshold lists; the target resource sub-pool is used to determine a second-type threshold list to which the target threshold belongs out of the X1 second-type threshold lists; the first priority and the second priority are used together to determine the target threshold out of a second-type threshold list to which the target threshold belongs.

In one embodiment, a first reference threshold is one of multiple reference thresholds, and the first reference threshold is one of the X1 first-type thresholds; the first priority and the second priority are used together to determine the first reference threshold out of the multiple reference thresholds, the target resource sub-pool is used to determine a first offset value, and the first reference threshold and the first offset value are used together to determine the target threshold.

In one embodiment, the second node 1000 is a UE.

In one embodiment, the second node 1000 is a relay node.

In one embodiment, the second node 1000 is a base station.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules.

The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, tele-controlled aircrafts and other wireless communication devices. The second node in the present application includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, tele-controlled aircrafts and other wireless communication devices. The UE or terminal in the present application includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, tele-controlled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising: a first receiver, receiving a first signaling, the first signaling indicating a first resource pool and X1 resource sub-pools, any of the X1 resource sub-pools belonging to the first resource pool, X1 being a positive integer greater than 1; a second receiver, determining a candidate resource set out of the first resource pool, the candidate resource set comprising at least one candidate time-frequency resource block; and a first transmitter, transmitting a target signal on a target time-frequency resource block, the target time-frequency resource block being a candidate time-frequency resource block comprised in the candidate resource set; wherein the candidate resource set comprises at least one candidate resource subset, a target resource subset is one of the at least one candidate resource subset comprised in the candidate resource set; a candidate time-frequency resource block in the target resource subset belongs to a target resource sub-pool, and the target resource sub-pool is one of the X1 resource sub-pools; the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and the target threshold is used to determine the target resource subset out of the target resource sub-pool.

2. The first node according to claim 1, comprising: the second receiver, monitoring a second signaling in the first resource pool, the second signaling indicating a second priority and a first time-frequency resource block; and the second receiver, measuring in the first time-frequency resource block, the first time-frequency resource block belonging to the target resource sub-pool; wherein the first priority, the second priority and the target resource sub-pool are used together to determine the target threshold out of the X1 first-type thresholds; the first time-frequency resource block is associated with a second time-frequency resource block, the second time-frequency resource block belongs to the target resource sub-pool, and the first time-frequency resource block and the second time-frequency resource block are orthogonal in time domain; a size relationship of a measurement result in the first time-frequency resource block and the target threshold is used to determine whether the second time-frequency resource block belongs to the target resource subset.

3. The first node according to claim 2, wherein the X1 first-type threshold belong to one of multiple first-type threshold lists, the first priority and the second priority are used together to determine a first-type threshold list to which the X1 first-type thresholds belong out of the multiple first-type threshold lists, and the target resource sub-pool is used to determine the target threshold out of the X1 first-type thresholds; or, the X1 first-type thresholds respectively belong to X1 second-type threshold lists, the target threshold belongs to one of the X1 second-type threshold lists, the target resource sub-pool is used to determine a second-type threshold list to which the target threshold belongs out of the X1 second-type threshold lists, and the first priority and the second priority are used together to determine the target threshold out of a second-type threshold list to which the target threshold belongs; or, a first reference threshold is one of multiple reference thresholds, the first reference threshold is one of the X1 first-type thresholds, the first priority and the second priority are used together to determine the first reference threshold out of the multiple reference thresholds, the target resource sub-pool is used to determine a first offset, and the first reference threshold and the first offset are used together to determine the target threshold.

4. The first node according to claim 3, wherein the X1 resource sub-pools comprise a first resource sub-pool and a second resource sub-pool; a first threshold is a first-type threshold corresponding to the first resource sub-pool among the X1 first-type thresholds, and a second threshold is a first-type threshold corresponding to the second resource sub-pool among the X1 first-type thresholds, and the first threshold is greater than the second threshold; the first threshold is used to determine a first candidate resource subset out of the first resource sub-pool, and the first candidate resource subset belongs to the candidate resource set.

5. The first node according to claim 4, wherein the second threshold is used to determine a second candidate resource subset out of the second resource sub-pool; the second candidate resource subset belongs to the candidate resource set; a former of the first candidate resource subset and the second candidate resource subset is preferentially used to select the target time-frequency resource block.

6. The first node according to claim 4, wherein the first candidate resource subset comprises Q1 candidate time-frequency resource blocks, Q1 being a positive integer greater than 1; a size relationship of Q1 and a first value is used to determine whether the candidate resource set is orthogonal to the second resource sub-pool.

7. A method in a first node for wireless communications, comprising: receiving a first signaling, the first signaling indicating a first resource pool and X1 resource sub-pools, any of the X1 resource sub-pools belonging to the first resource pool, X1 being a positive integer greater than 1; determining a candidate resource set out of the first resource pool, the candidate resource set comprising at least one candidate time-frequency resource block; and transmitting a target signal on a target time-frequency resource block, the target time-frequency resource block being a candidate time-frequency resource block comprised in the candidate resource set; wherein the candidate resource set comprises at least one candidate resource subset, a target resource subset is one of the at least one candidate resource subset comprised in the candidate resource set; a candidate time-frequency resource block in the target resource subset belongs to a target resource sub-pool, and the target resource sub-pool is one of the X1 resource sub-pools; the first signaling indicates a first priority, and the first priority is used to determine X1 first-type thresholds; the X1 resource sub-pools respectively correspond to the X1 first-type thresholds; a target threshold is a first-type threshold corresponding to the target resource sub-pool among the X1 first-type thresholds, and the target threshold is used to determine the target resource subset out of the target resource sub-pool.

8. The method according to claim 7, comprising: monitoring a second signaling in the first resource pool, the second signaling indicating a second priority and a first time-frequency resource block; and measuring in the first time-frequency resource block, the first time-frequency resource block belonging to the target resource sub-pool; wherein the first priority, the second priority and the target resource sub-pool are used together to determine the target threshold out of the X1 first-type thresholds; the first time-frequency resource block is associated with a second time-frequency resource block, the second time-frequency resource block belongs to the target resource sub-pool, and the first time-frequency resource block and the second time-frequency resource block are orthogonal in time domain; a size relationship of a measurement result for the first time-frequency resource block and the target threshold is used to determine whether the second time-frequency resource block belongs to the target resource subset.

9. The method according to claim 8, wherein the X1 first-type thresholds belong to one of multiple first-type threshold lists, the first priority and the second priority are used together to determine a first-type threshold list to which the X1 first-type thresholds belong out of the multiple first-type threshold lists, and the target resource sub-pool is used to determine the target threshold out of the X1 first-type thresholds; or, the X1 first-type thresholds respectively belong to X1 second-type threshold lists, the target threshold belongs to one of the X1 second-type threshold lists, the target resource sub-pool is used to determine a second-type threshold list to which the target threshold belongs out of the X1 second-type threshold lists, and the first priority and the second priority are used together to determine the target threshold out of a second-type threshold list to which the target threshold belongs; or, a first reference threshold is one of multiple reference thresholds, the first reference threshold is one of the X1 first-type thresholds, the first priority and the second priority are used together to determine the first reference threshold out of the multiple reference thresholds, the target resource sub-pool is used to determine a first offset value, and the first reference threshold and the first offset value are used together to determine the target threshold.

10. The method according to claim 7, wherein the X1 resource sub-pools comprise a first resource sub-pool and a second resource sub-pool; a first threshold is a first-type threshold corresponding to the first resource sub-pool among the X1 first-type thresholds, and a second threshold is a first-type threshold corresponding to the second resource sub-pool among the X1 first-type thresholds, and the first threshold is greater than the second threshold; the first threshold is used to determine a first candidate resource subset out of the first resource sub-pool, and the first candidate resource subset belongs to the candidate resource set.

11. The method according to claim 10, wherein the second threshold is used to determine a second candidate resource subset out of the second resource sub-pool; the second candidate resource subset belongs to the candidate resource set; a former of the first candidate resource subset and the second candidate resource subset is preferentially used to select the target time-frequency resource block.

12. The method according to claim 10, wherein the first candidate resource subset comprises Q1 candidate time-frequency resource blocks, Q1 being a positive integer greater than 1; a size relationship of Q1 and a first value is used to determine whether the candidate resource set is orthogonal to the second resource sub-pool.

* * * * *